(12) United States Patent
Takayama et al.

(10) Patent No.: US 12,084,328 B2
(45) Date of Patent: Sep. 10, 2024

(54) MOVER CONTROL METHOD, MOVER CONTROL SYSTEM, AND PROGRAM

(71) Applicant: Panasonic Intellectual Property Management Co., Ltd., Osaka (JP)

(72) Inventors: Seigo Takayama, Osaka (JP); Takaaki Imanaka, Hyogo (JP); Kentaro Murata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 17/435,149

(22) PCT Filed: Feb. 12, 2020

(86) PCT No.: PCT/JP2020/005380
§ 371 (c)(1),
(2) Date: Aug. 31, 2021

(87) PCT Pub. No.: WO2020/179386
PCT Pub. Date: Sep. 10, 2020

(65) Prior Publication Data
US 2022/0135384 A1 May 5, 2022

(30) Foreign Application Priority Data

Mar. 4, 2019 (JP) .................................. 2019-039008
Mar. 4, 2019 (JP) .................................. 2019-039009
Mar. 4, 2019 (JP) .................................. 2019-039010

(51) Int. Cl.
*B66F 9/075* (2006.01)
*B66F 9/06* (2006.01)
(Continued)

(52) U.S. Cl.
CPC ............ *B66F 9/0755* (2013.01); *B66F 9/063* (2013.01); *G05D 1/0088* (2013.01);
(Continued)

(58) Field of Classification Search
CPC ..... B66F 9/0755; B66F 9/063; G05D 1/0088; G05D 1/0246; G05D 1/0238; G06T 7/73; G06T 2207/30252
See application file for complete search history.

(56) References Cited

U.S. PATENT DOCUMENTS 4,583,640 A * 4/1986 Gillam ................ H01R 13/514
206/820
5,310,076 A * 5/1994 Burton .................. H05K 7/023
206/719
(Continued)

FOREIGN PATENT DOCUMENTS

CN 109018810 A 12/2018
JP H10-081240 A 3/1998
(Continued)

OTHER PUBLICATIONS

International Search Report issued in Patent Application No. PCT/JP2020/005380 dated Apr. 7, 2020.
(Continued)

*Primary Examiner* — Mussa A Shaawat
(74) *Attorney, Agent, or Firm* — PEARNE & GORDON LLP

(57) ABSTRACT

A mover control method includes decision processing and control processing. The decision processing is the processing of determining whether or not a mover that is carrying an object thereon is going to deviate from a traveling route, through which the mover, as well as the object, is allowed
(Continued)

to pass. The control processing (first control processing) is the processing of controlling the mover based on a result of the decision processing.

20 Claims, 18 Drawing Sheets

(51) Int. Cl.
*G05D 1/00* (2024.01)
*G05D 1/02* (2020.01)
*G06T 7/73* (2017.01)

(52) U.S. Cl.
CPC .............. *G05D 1/0246* (2013.01); *G06T 7/73* (2017.01); *G06T 2207/30252* (2013.01)

(56) References Cited

U.S. PATENT DOCUMENTS

| | | | | |
|---|---|---|---|---|
| 5,547,082 | A * | 8/1996 | Royer | H05K 13/0084 206/725 |
| 8,280,547 | B2 * | 10/2012 | D'Andrea | G05B 13/00 700/214 |
| 9,561,941 | B1 * | 2/2017 | Watts | B66F 9/0755 |
| 10,209,711 | B1 * | 2/2019 | Brazeau | G05D 1/0221 |
| 10,409,281 | B1 * | 9/2019 | Garrett | G05D 1/0225 |
| 11,353,883 | B2 * | 6/2022 | Ikawa | G06V 10/26 |
| 2012/0255810 | A1 * | 10/2012 | Yang | B66F 9/063 187/222 |
| 2016/0176638 | A1 * | 6/2016 | Toebes | B66F 9/06 701/25 |
| 2016/0260054 | A1 * | 9/2016 | High | G05D 1/0219 |
| 2017/0072558 | A1 | 3/2017 | Reynolds et al. | |
| 2017/0236422 | A1 | 8/2017 | Naka et al. | |
| 2018/0129220 | A1 * | 5/2018 | Beach | G01C 21/3407 |
| 2018/0246523 | A1 | 8/2018 | Ogihara et al. | |
| 2019/0160675 | A1 * | 5/2019 | Paschall, II | G05D 1/0088 |
| 2019/0176328 | A1 * | 6/2019 | Kichkaylo | B66F 9/24 |
| 2019/0187699 | A1 * | 6/2019 | Salour | G05D 1/024 |
| 2019/0194005 | A1 * | 6/2019 | Shah | G06T 7/73 |
| 2019/0227571 | A1 * | 7/2019 | Ito | G05D 1/0282 |
| 2020/0142427 | A1 | 5/2020 | Ogihara et al. | |
| 2020/0238519 | A1 * | 7/2020 | Diankov | B25J 9/1664 |
| 2020/0348683 | A1 | 11/2020 | Hu | |
| 2021/0300739 | A1 * | 9/2021 | Surjaatmadja | G05D 1/0261 |

FOREIGN PATENT DOCUMENTS

| | | |
|---|---|---|
| JP | 2006-079319 A | 3/2006 |
| JP | 2007-283434 A | 11/2007 |
| JP | 2012-025306 A | 2/2012 |
| JP | 2016-081159 A | 5/2016 |
| JP | 2017-201493 A | 11/2017 |
| WO | 2016/051818 A1 | 4/2016 |
| WO | 2017/163790 A1 | 9/2017 |

OTHER PUBLICATIONS

Japanese Office Action issued in Japanese Patent Application No. 2021-503498 dated Jan. 30, 2024.
Chinese Office Action issued in Chinese Patent Application No. 202080017921.2 dated Dec. 15, 2023.
Japanese Office Action issued in Japanese Patent Application No. 2021-503498 dated Jul. 2, 2024.

* cited by examiner

FIG. 9
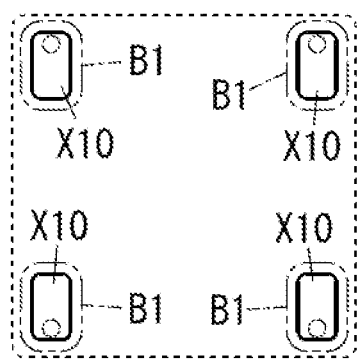
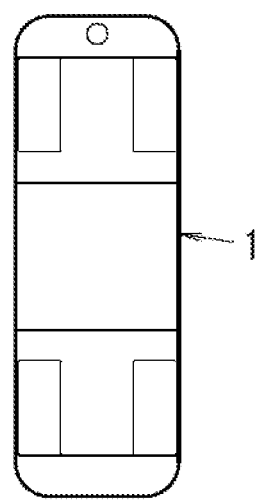

FIG. 10
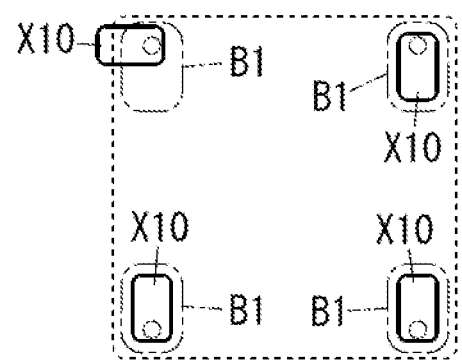
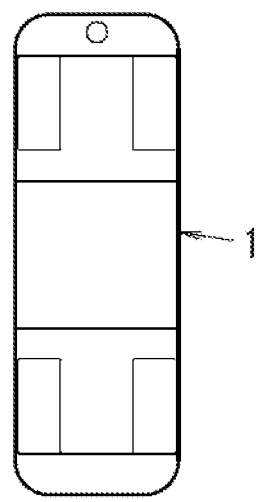

FIG. 11
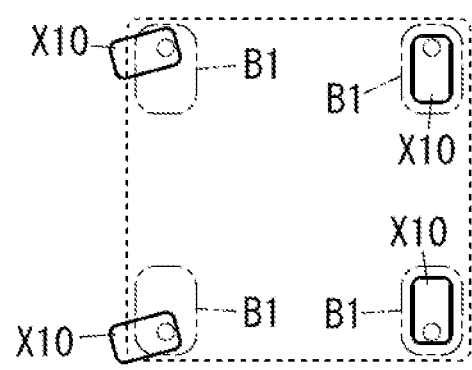
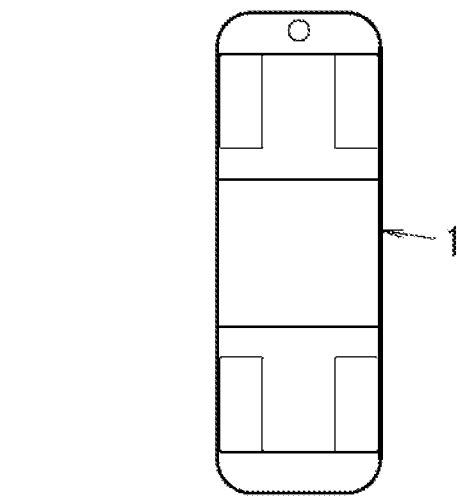

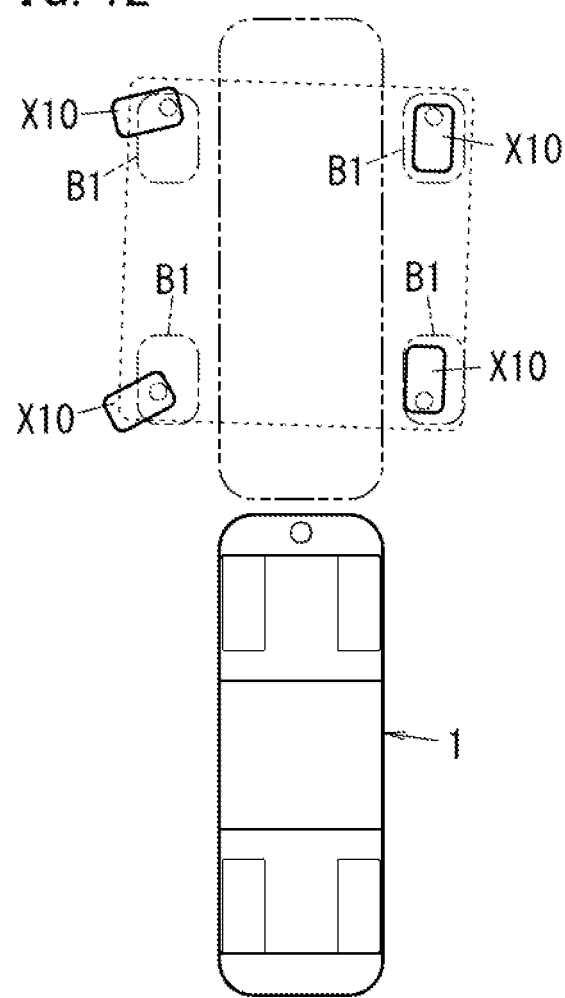

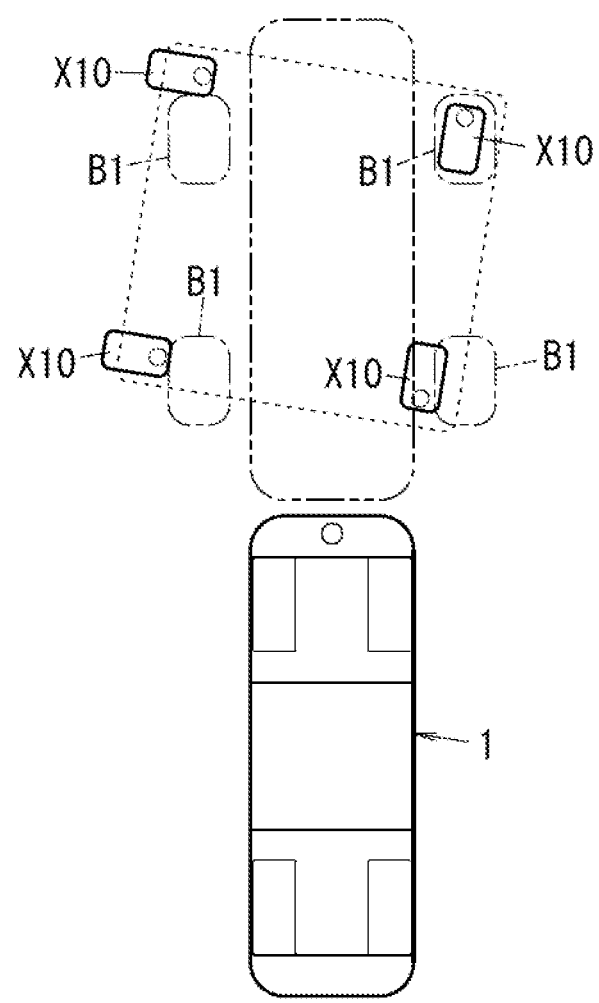

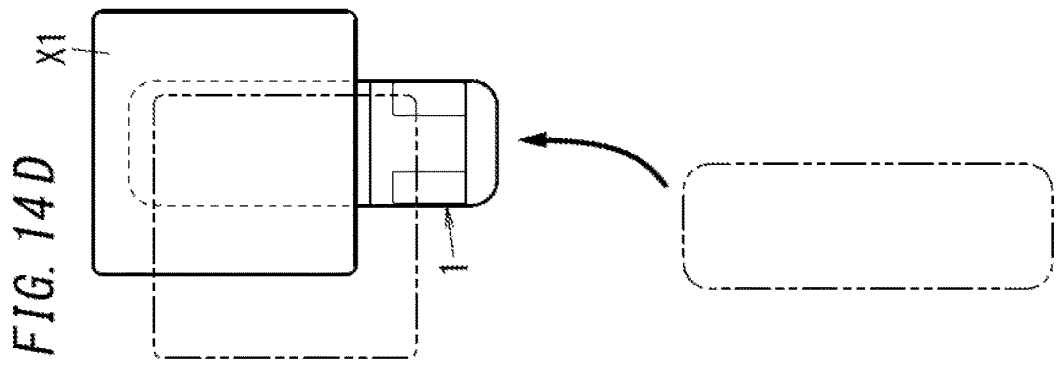
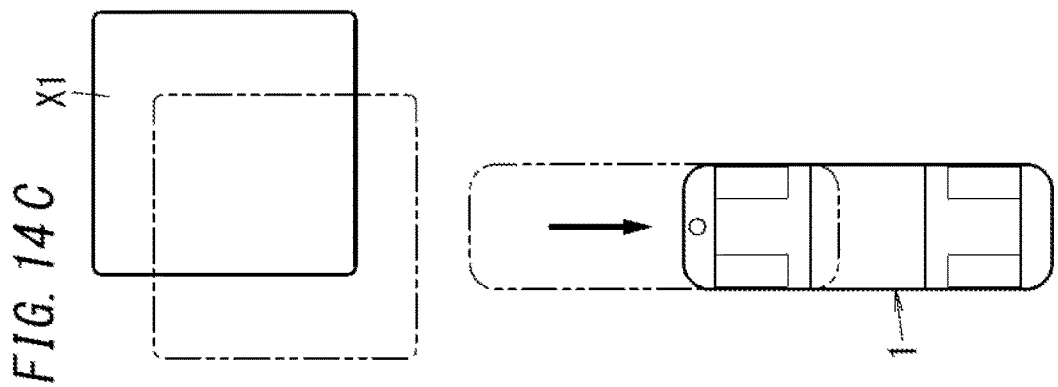
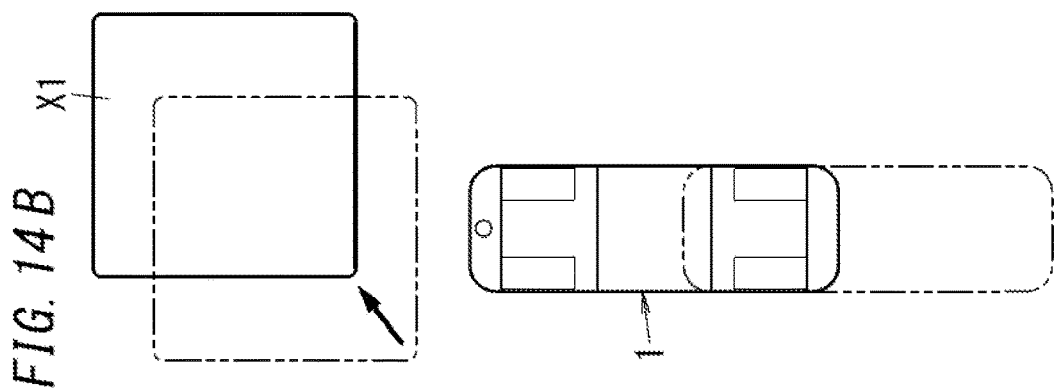
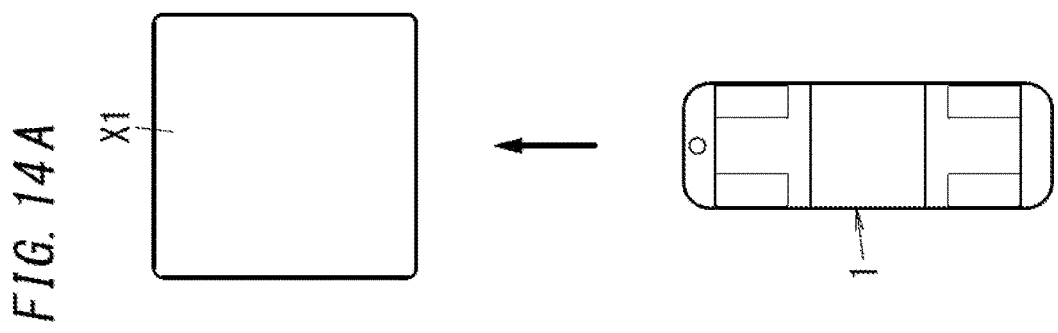

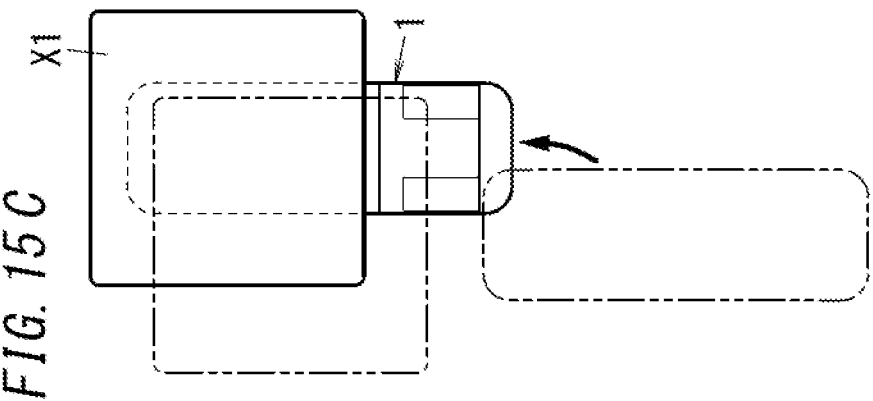
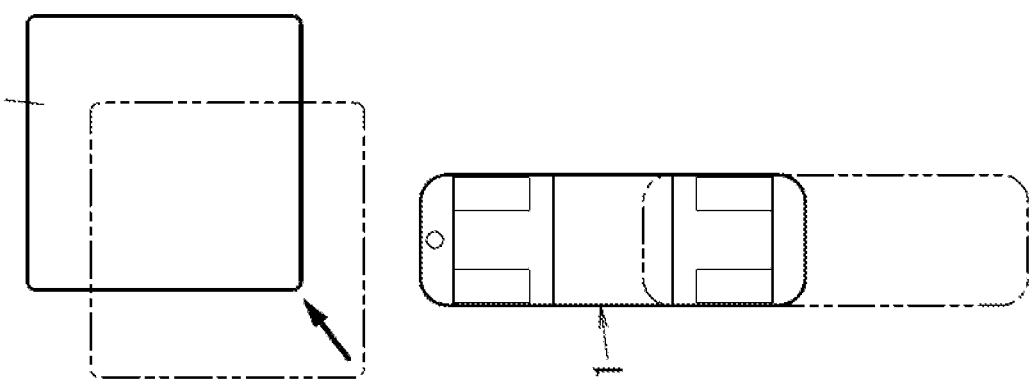
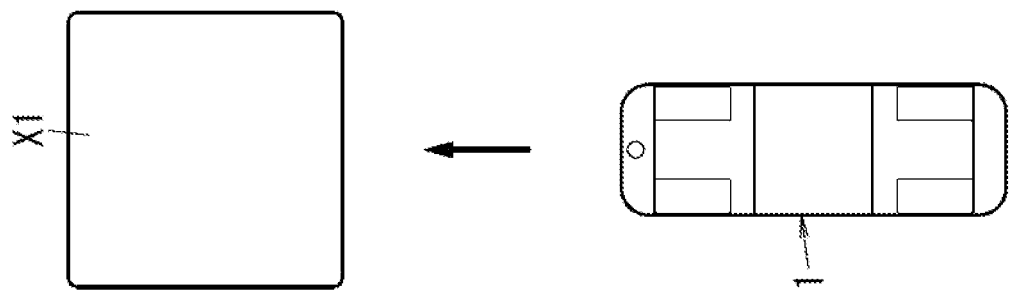

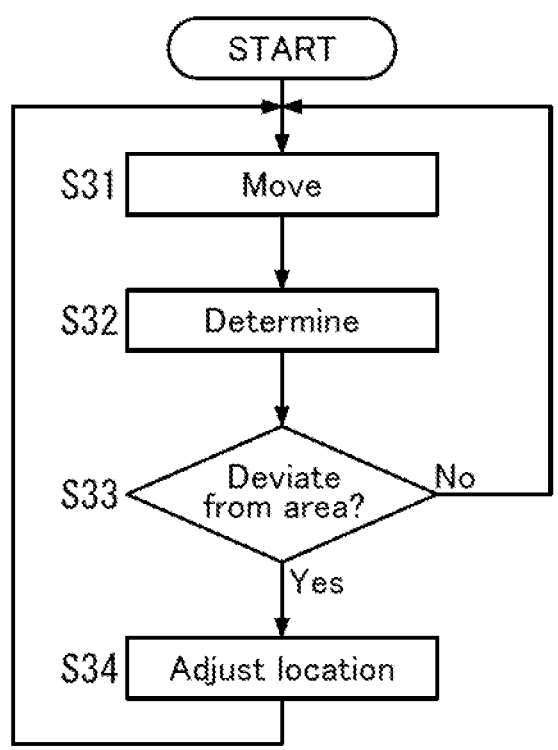

MOVER CONTROL METHOD, MOVER CONTROL SYSTEM, AND PROGRAM

CROSS-REFERENCE TO RELATED APPLICATIONS

This application is a U.S. national stage application of the PCT International Application No. PCT/JP2020/005380 filed on Feb. 12, 2020, which claims the benefit of foreign priority of Japanese Patent Application No. 2019-039009 filed on Mar. 4, 2019, Japanese Patent Application No. 2019-039010 filed on Mar. 4, 2019 and Japanese Patent Application No. 2019-039008 filed on Mar. 4, 2019, the contents all of which are incorporated herein by reference.

TECHNICAL FIELD

The present disclosure generally relates to a mover control method, a mover control system, and a program, and more particularly relates to a mover control method for controlling a mover equipped with a detection unit to detect an object, a mover control system, and a program.

BACKGROUND ART

Patent Literature 1 discloses a pallet truck (as an exemplary mover) for carrying a pallet (as an exemplary object). In this pallet truck, a fork is assembled by a lift-up mechanism onto a rear portion (located closer to the fork) of the body of the truck so as to be readily elevated or lowered. In addition, in this pallet truck, small wheels are attached onto a tip portion of the fork.

In a mover control method using a mover (pallet truck) such as the one disclosed in Patent Literature 1, the mover suitably moves smoothly while holding the pallet as an object thereon.

CITATION LIST

Patent Literature

Patent Literature 1: JP H10-81240 A

SUMMARY OF INVENTION

In view of the foregoing background, it is therefore an object of the present disclosure to provide a mover control method, a mover control system, and a program, all of which are configured or designed to allow a mover to move smoothly while holding an object thereon.

A mover control method according to an aspect of the present disclosure includes decision processing and control processing. The decision processing is the processing of determining whether or not a mover that is carrying an object thereon is going to deviate from a traveling route, through which the mover, as well as the object, is allowed to pass. The control processing is the processing of controlling the mover based on a result of the decision processing.

A mover control system according to another aspect of the present disclosure includes: a mover to carry an object thereon; and a control system to control the mover. The control system includes a decision unit and a control unit. The decision unit determines whether or not the mover that is carrying the object thereon is going to deviate from a traveling route, through which the mover, as well as the object, is allowed to pass. The control unit controls the mover based on a result obtained by the decision unit.

A program according to still another aspect of the present disclosure is designed to cause one or more processors to carry out the mover control method described above.

BRIEF DESCRIPTION OF DRAWINGS

FIG. 9 is a schematic plan view illustrating a mover and feature portions of an object in the second operation example of the mover control system;

FIG. 10 is a schematic plan view illustrating the mover and the feature portions of the object in the second operation example of the mover control system;

FIG. 11 is a schematic plan view illustrating the mover and the feature portions of the object in the second operation example of the mover control system;

FIG. 12 is a schematic plan view illustrating the mover and the feature portions of the object in the second operation example of the mover control system;

FIG. 13 is a schematic plan view illustrating the mover and the feature portions of the object in the second operation example of the mover control system;

FIGS. 14A-14D are schematic plan views each illustrating the mover and the object in the second operation example of the mover control system;

FIGS. 15A-15C are schematic plan views each illustrating the mover and the object in the second operation example of the mover control system;

FIG. 17 is a flowchart showing a third operation example of the mover control system according to the exemplary embodiment of the present disclosure.

DESCRIPTION OF EMBODIMENTS

(1) Overview

Figure 1:
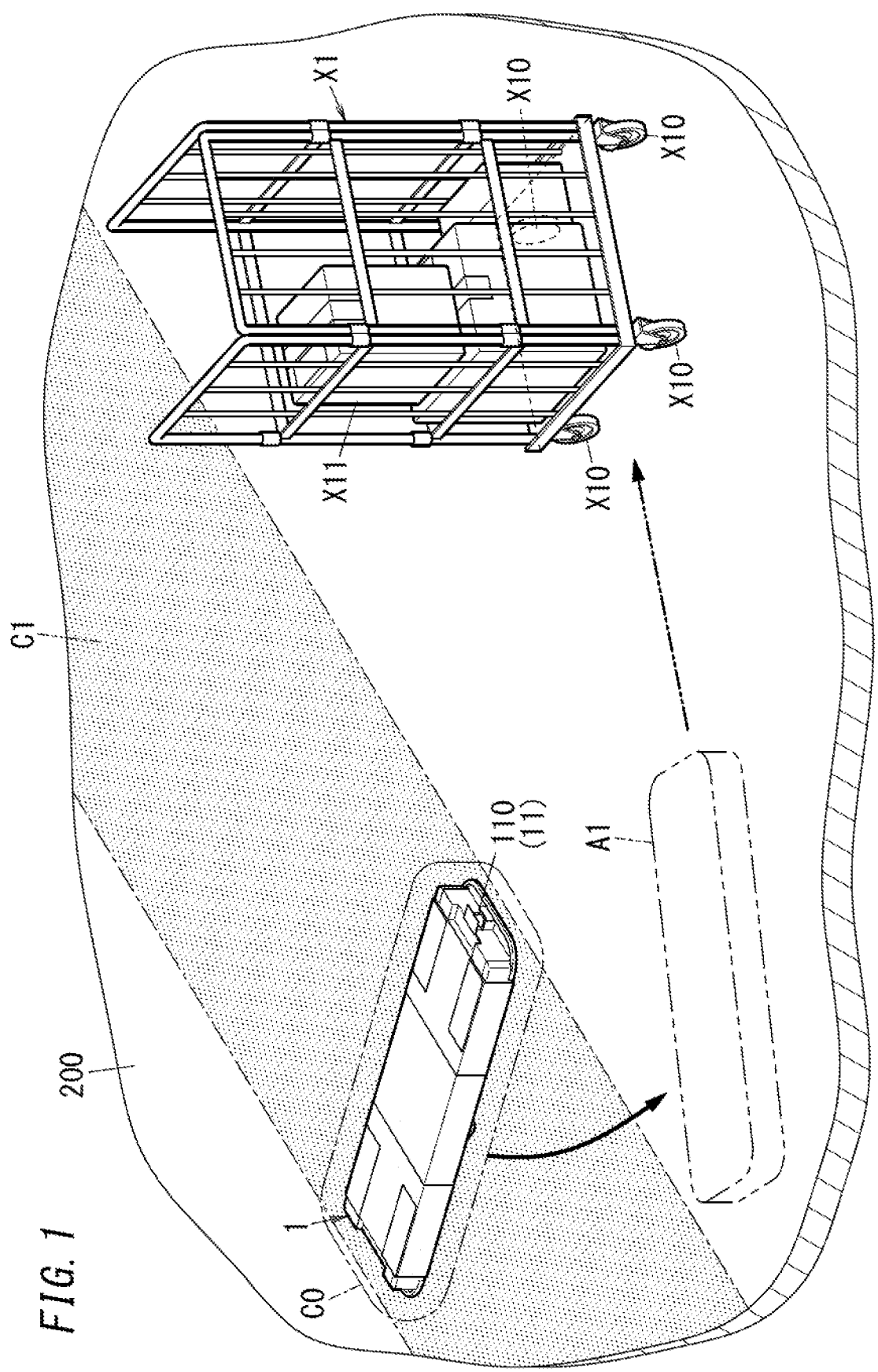
FIG. 1 is a perspective view illustrating the appearance of a mover and an object in a mover control system according to an exemplary embodiment of the present disclosure.
Figure 3:
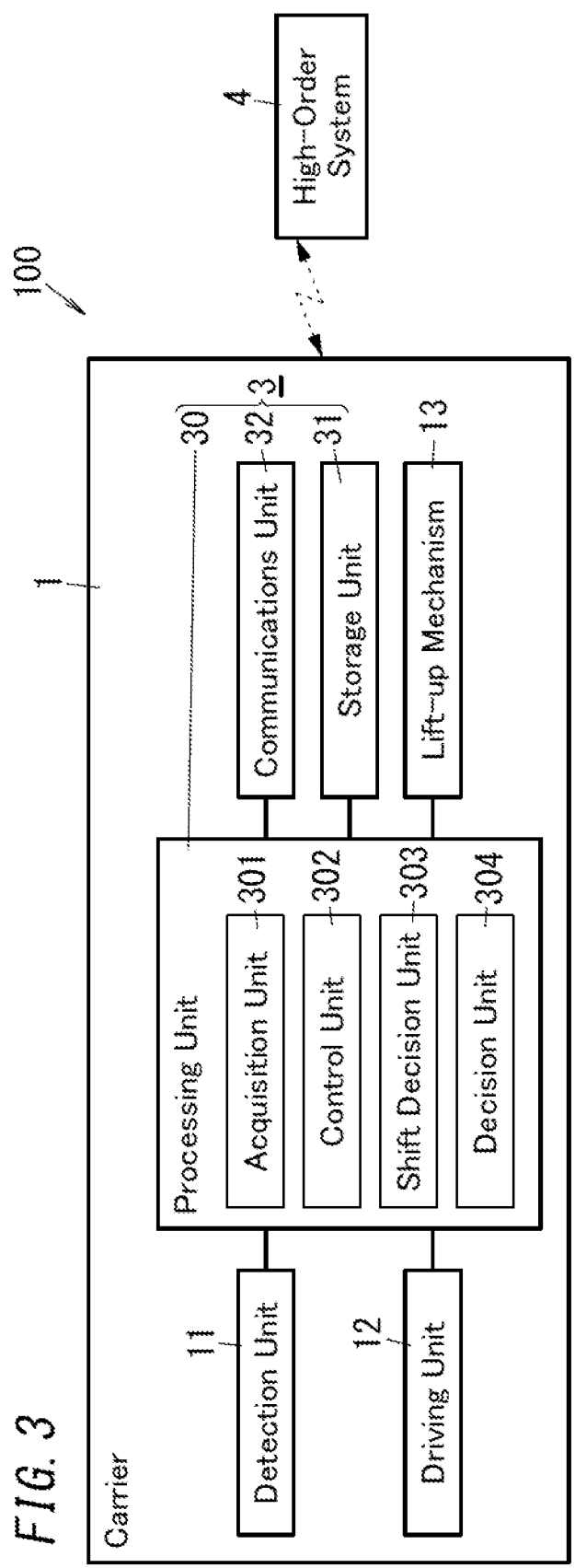
FIG. 3 is a block diagram of the mover control system.

A mover control method according to an exemplary embodiment is a method for causing a mover 1 with a detection unit 11 to move to an object X1 as shown in FIG. 1. This mover control method may be carried out by, for example, a mover control system 100. As shown in FIG. 3, the mover control system 100 includes the mover 1 and a control system 3. The control system 3 is a system for controlling the mover 1.

Figure 2:
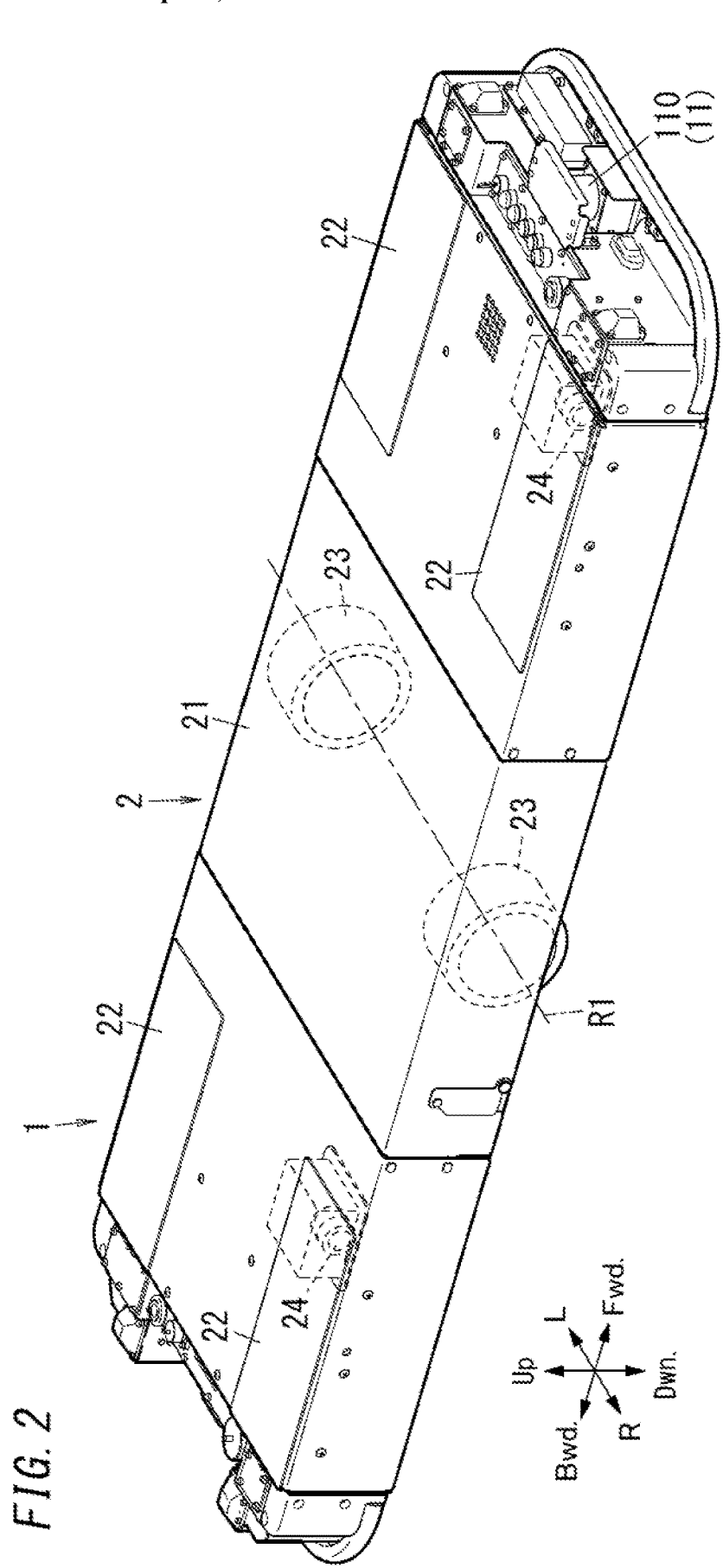
FIG. 2 is a perspective view illustrating the appearance of the mover for use in the mover control system.

The mover 1 is a device configured to move on a traveling surface 200 on one or more wheels (driving wheels) 23 (see FIG. 2). In this embodiment, the mover 1 is a device for carrying the object X1 thereon. In addition, the "mover" will be hereinafter referred to as a "carrier" unless otherwise stated. The carrier 1 may be introduced into, for example, distribution centers (including parcel shipping centers), factories, offices, stores, schools, hospitals, and various other facilities. As used herein, the "traveling surface 200" is a surface on which the carrier 1 is designed to move. If the carrier 1 moves inside of a facility, the traveling surface 200 may be the floor surface of the facility, for example. On the other hand, if the carrier 1 moves outdoors, then the traveling surface 200 may be the ground, for example. In the following description of embodiments, a situation where the carrier 1 is introduced into a distribution center will be described.

The carrier 1 includes a body 2 and a detection unit 11 as shown in FIGS. 1 and 2. The body 2 includes wheels 23 and is configured to move on the traveling surface 200 by turning its wheels 23. In this embodiment, the body 2 is able to travel autonomously. The detection unit 11 is provided for the body 2 to detect a situation surrounding the body 2 (hereinafter also referred to as "surroundings of the body 2"). As used herein, the "surroundings of the body" correspond to a detectible range for the detection unit 11. That is to say, the range indicated by the "surroundings of the body" depends on the performance of the detection unit 11. In other words, the "surroundings of the body" sometimes refers to the entire 360-degree range surrounding the body 2 in all directions and sometimes refers to only an area that defines a predetermined angle with respect to a particular part of the body 2 as a vertex.

In the mover control method for allowing the mover 1 of this type to move to the object X1, the mover 1 is suitably allowed to move smoothly to the object X1. In addition, if the mover 1 is a carrier 1, the mover 1 is suitably allowed to move smoothly while holding the object X1 thereon, according to the mover control method for allowing the carrier (mover) 1 for carrying the object X1 of this type to move.

Thus, the mover control method according to this embodiment attempts to overcome these problems by the following three methods:

A first exemplary mover control method includes acquisition processing and control processing (second control processing). The acquisition processing is the processing of acquiring a detection result obtained by the detection unit 11 and including distance information about a distance between the mover 1 and the object X1. The control processing is the processing of controlling the mover 1 based on the detection result on recognizing some of a plurality of feature portions X10 of the object X1 to estimate a location and an orientation of the object X1.

This method facilitates taking, at a point in time when some of the feature portions X10 of the object X1 are recognized, some measures such as causing the mover 1 to move to a location where the mover 1 may easily recognize the feature portions X10, compared to a method by which the mover 1 is not allowed to move until all of the feature portions X10 of the object X1 are recognized. That is to say, this method has the advantage of allowing the mover 1 to smoothly move to the object X1 more easily.

A second exemplary mover control method includes shift decision processing and control processing (third control processing). The shift decision processing is the processing of determining whether or not the object X1 has shifted while the mover 1 is moving to the object X1. The control processing is the processing of controlling the mover 1 when a decision is made, as a result of the shift decision processing, that the object X1 should have shifted.

This method enables taking, at a point in time when a decision is made that the object X1 should have shifted, some measures such as modifying the track of the mover 1, compared to a method by which the mover 1 is caused to move along the initially set track, no matter whether or not the object X1 has shifted. That is to say, this method has the advantage of allowing the mover 1 to smoothly move to the object X1 more easily.

A third exemplary mover control method includes decision processing and control processing (first control processing). The decision processing is the processing of determining whether or not a mover 1 that is carrying an object X1 thereon is going to deviate from a traveling route C1 (see FIG. 16), through which the mover 1, as well as the object X1, is allowed to pass. The boundary of the traveling route C1 may be not only an insubstantial boundary which is virtually set on the traveling surface 200 by the high-order system 4 but also a substantial boundary such as a wall. The control processing is the processing of controlling the mover 1 based on a result of the decision processing.

This method allows taking some preventive measures (such as modifying the track of the mover 1) at a point in time when a decision is made that the mover 1 is going to deviate from the traveling route C1, compared to a method in which the mover 1 is allowed to move without taking deviation from the traveling route C1 into account. That is to say, this method has the advantage of allowing the mover 1 to smoothly move more easily while holding the object X1 thereon.

(2) Details

A mover control system 100 and carrier (mover) 1 according to this embodiment will be described in detail with reference to FIGS. 1-3. In the following description, unless otherwise stated, the direction perpendicular to the traveling surface 200 (i.e., the vertical direction) will be hereinafter referred to as an "upward/downward direction" and the carrier 1 is supposed to be located "over" the traveling surface 200. Stated otherwise, the traveling surface 200 is supposed to be located "under" the carrier 1. Also, while the carrier 1 is moving forward, the direction in which the carrier 1 goes will be hereinafter referred to as a "forward direction" and the opposite direction will be hereinafter referred to as a "backward direction." Furthermore, the direction that is perpendicular to both the upward/downward direction and the forward/backward direction will be hereinafter referred to as a "rightward/leftward direction." However, these directions are only an example and should not be construed as limiting the directions in which the carrier 1 is used. It should also be noted that the arrows indicating the respective directions on the drawings are shown there only for the sake of convenience of description and insubstantial ones. Furthermore, an arrow extended from a thing (such as the carrier 1 or the object X1) illustrated on the drawings just indicates the direction in which the thing moves and is also an insubstantial one.

(2.1) Mover Control System

First of all, an overall configuration for the mover control system 100 according to this embodiment will be described.

As shown in FIG. 3, the mover control system 100 according to this embodiment includes a control system 3 and at least one carrier 1. In this embodiment, the mover control system 100 includes a plurality of carriers 1.

In this embodiment, the control system 3 is built in, and thereby integrated with, the carrier 1. That is to say, in the single housing of the carrier, housed are constituent elements that perform the functions of the carrier 1 and constituent elements of the control system 3.

In this embodiment, the mover control system 100 includes the plurality of carriers 1, and therefore, includes a plurality of control systems 3 corresponding to the plurality of carriers 1 accordingly. In other words, the mover control system 100 includes a plurality of control systems 3 corresponding one to one to the plurality of carriers 1. The following description will be focused on a single carrier 1, selected arbitrarily from the plurality of carriers 1, and the control system 3 built in the carrier 1, unless otherwise stated. The following description is equally applicable to all of the other carriers 1 and each and every control system 3.

Furthermore, in this embodiment, the mover control system 100 includes, as shown in FIG. 3, not only the carrier 1 and the control system 3 but also a high-order system 4 for remote-controlling the carrier 1 as well.

The high-order system 4 and the control system 3 are configured to be communicative with each other. As used herein, "to be communicative" refers to a state in which information may be transmitted and received either directly or indirectly over a network or via a relay, for example, by an appropriate communication method such as wired communication or wireless communication. That is to say, the high-order system 4 and the control system 3 may transmit and receive information to/from each other. In this embodiment, the high-order system 4 and the control system 3 are bidirectionally communicative with each other. Specifically, information may be transmitted from the high-order system 4 to the control system 3, and vice versa (i.e., from the control system 3 to the high-order system 4).

The high-order system 4 remotely controls at least one carrier 1 (e.g., a plurality of carriers 1 in this embodiment). Specifically, the high-order system 4 controls the carrier 1 indirectly via the control system 3 by communicating with the control system 3. That is to say, the high-order system 4 controls the carrier 1 in accordance with an instruction transmitted from a device outside of the carrier 1 to the control system 3 built in the carrier 1 (i.e., in accordance with a carry instruction). The high-order system 4 may transmit, for example, the instruction (carry instruction) and data such as electronic map data to the control system 3.

In this embodiment, the high-order system 4 may be implemented as a server and includes, as a major constituent element, a computer system including one or more processors and one or more memories. The computer system performs the function of the high-order system 4 by making the processor of the computer system execute a program stored in the memory of the computer system. The program may be stored in the memory. Alternatively, the program may also be downloaded via a telecommunications line such as the Internet or distributed after having been stored in a non-transitory storage medium such as a memory card.

The high-order system 4 estimates, based on, for example, a result of detection by the detection unit 11 of the carrier 1 (to be described later), at least the current location of the carrier 1 and thereby determines the traveling route C1 (see FIG. 1) to the target node C0 (see FIG. 1) for the carrier 1 (i.e., sets a route plan). The high-order system 4 gives the carrier 1 an instruction via the control system 3 to make the carrier 1 travel along the traveling route C1. This enables the carrier 1 to be controlled remotely.

(2.2) Carrier

As shown in FIGS. 1 and 2, the carrier 1 includes the body 2, the detection unit 11, a driving unit 12, and a lift-up mechanism 13. In addition, the carrier 1 further includes a control system 3 to be described later. In this embodiment, the carrier 1 uses a processing unit for controlling the detection unit 11, the driving unit 12, and the lift-up mechanism 13 as the processing unit 30 (to be described later) of the control system 3. However, this is only an example of the present disclosure and should not be construed as limiting. Alternatively, the carrier 1 may naturally include another processing unit for controlling the detection unit 11, the driving unit 12, and the lift-up mechanism 13 separately from the processing unit 30 of the control system 3. The detection unit 11, the driving unit 12, the lift-up mechanism 13, and the control system 3 are all built in the body 2.

The carrier 1 may travel autonomously on a flat traveling surface 200 such as the floor surface of a facility. In this embodiment, the carrier 1 is supposed to be provided with a storage battery and be powered by the electric energy stored in the storage battery. In this embodiment, the carrier 1 travels on the traveling surface 200 with the body 2 loaded with the object X1. This allows the carrier 1 to carry, for example, the object X1 placed at a certain location inside the facility to somewhere else inside the facility.

In this embodiment, the object X1 may include packages X11, a final product completed at a manufacturing factory, a work in progress (i.e., a half-finished product being manufactured), a pallet, or a pallet loaded with the packages X11. That is to say, in this embodiment, the object X1 is a burden to be carried by the mover 1. The pallet may be either a roll box pallet (including a cold roll box pallet) or a flat pallet. In the following description, unless otherwise stated, the object X1 is supposed to be a roll box palette loaded with the packages X11.

The body 2 is configured in the shape of a rectangular parallelepiped, of which the dimension measured in the forward/backward direction (i.e., its length) is greater than its dimension measured in the rightward/leftward direction (i.e., its width) and of which the dimension measured in the upward/downward direction (i.e., its height) is smaller than its length and its width. As will be described in detail later, in this embodiment, the object X1 is placed on the body 2 so as to be lifted by the body 2 that has slipped into the gap under the object X1. Thus, the dimension measured in the upward/downward direction of the body 2 is set at a value sufficiently smaller than its dimension measured in the rightward/leftward direction such that the body 2 may enter the gap under the object X1.

The body 2 includes a vehicle body 21 and a plurality of elevator plates 22. In this embodiment, the body 2 is made of a metallic material. However, the body 2 does not have to be made of a metallic material but may also be made of a resin, for example.

The vehicle body 21 is supported on the traveling surface 200 by a plurality of (e.g., two in this embodiment) wheels 23 and a plurality of (e.g., two in this embodiment) auxiliary wheels 24.

The plurality of wheels 23 are provided in a central area along the length (forward/backward direction) of the vehicle body 21 so as to be spaced apart from each other along the width (rightward/leftward direction) of the vehicle body 21. Each of the plurality of wheels 23 may turn on an individual basis on receiving the driving force from the driving unit 12. Each wheel 23 is held by the body 2 (vehicle body 21) so as to be ready to turn around a rotational axis R1 extending in the rightward/leftward direction.

The plurality of auxiliary wheels 24 are provided in a central area along the width (rightward/leftward direction) of the vehicle body 21 so as to be spaced apart from each other along the length (forward/backward direction) of the vehicle body 21. Each of the plurality of auxiliary wheels 24 may turn on an individual basis without receiving the driving force from the driving unit 12.

In this embodiment, all of the plurality of wheels 23 are "drive wheels" to be driven by the driving unit 12. Having all of these wheels 23 driven on an individual basis by the driving unit 12 allows the body 2 to move in every direction. That is to say, the body 2 is allowed to turn either to the right or to the left by turning the plurality of wheels 23 at mutually different angular velocities and to travel linearly by turning the plurality of wheels 23 at the same angular velocity. Thus, the body 2 may move forward and backward and turn to the right and to the left (including making a spin turn or a pivot turn). In addition, the body 2 may also move to draw a curved track (i.e., to make a curve).

Each of the plurality of elevator plates 22 is arranged over the vehicle body 21 so as to cover the upper surface of the vehicle body 21 at least partially. In this embodiment, the plurality of elevator plates 22 cover the four corners of the upper surface of the vehicle body 21. The upper surface of the elevator plates 22 defines a load platform to be loaded with the object X1 when the object X1 is carried by the carrier 1. In this embodiment, the upper surface of each elevator plate 22 (i.e., the load platform) is given a greater coefficient of friction than the other parts by being subjected to anti-slip treatment, for example. This reduces the chances of the object X1 placed on each elevator plate 22 slipping on the load platform.

In this embodiment, each elevator plate 22 is configured to be elevated and lowered by the lift-up mechanism 33 with respect to the vehicle body 21. Thus, elevating each elevator plate 22 with the body 2 slipped into the gap under the object X1 allows the object X1 to be lifted by each elevator plate 22. Conversely, lowering each elevator plate 22 with the object X1 lifted by the elevator plate 22 allows the object X1 to be unloaded from the elevator plate 22.

The detection unit 11 detects the location of the body 2, the behavior of the body 2, and a situation surrounding the body 2, or collects any other type of data. As used herein, the "behavior" of some member refers to the operation, appearance, and other information about the member. That is to say, the behavior of the body 2 includes the operating state of the body 2 indicating that the body 2 is traveling or at a stop, the velocity of the body 2 (and a variation in its velocity), acceleration applied to the body 2, and the orientation of the body 2. As used herein, the "surroundings" may also refer to the situation of the object X1 located around the body 2.

Specifically, the detection unit 11 may include a sensor such as a light detection and ranging (LiDAR) sensor, a sonar sensor, a radar (radio detection and ranging) sensor, or any other type of sensor, and detects a situation surrounding the body 2 with these sensors. The LiDAR is a sensor which uses light (a laser beam) for measuring the distance to the object X1 based on the light reflected from the object X1. The sonar sensor is a sensor which uses a sound wave such as an ultrasonic wave for measuring the distance to the object X1 based on the wave reflected from the object X1. The radar sensor is a sensor which uses an electromagnetic wave (radio wave) such as a microwave for measuring the distance to the object X1 based on the wave reflected from the object X1. That is to say, the result of detection by the detection unit 11 (i.e., the output of the detection unit 11) includes at least distance information about the distance between the carrier 1 (body 2) and the object X1. As used herein, the "distance information" may be any type of information reflecting the distance between the carrier 1 and the object X1, i.e., any type of information that varies according to the distance and does not have to be information about the distance itself between the carrier 1 and the object X1. In addition, the detection unit 11 includes, for example, a velocity sensor, an acceleration sensor, a gyrosensor, and other types of sensors, and detects the behavior of the body 2 by using these sensors.

In this embodiment, the detection unit 11 includes a sensor 110 implemented as a 2D-LiDAR (see FIG. 1). The sensor 110 is provided at a front end of the body 2 and used to mainly detect the situation in front of the body 2.

In addition, the detection unit 11 measures the number of revolutions of the drive wheels. Meanwhile, the processing unit 30 to be described later estimates the location of the body 2 by reference to information about, for example, the number of revolutions of the drive wheels as measured by the detection unit 11. That is to say, in this embodiment, the location of the body 2 is estimated mainly based on an electronic map acquired in advance, the result of detection obtained by the detection unit 11 (sensor 110), and so-called "dead-reckoning (DR)."

The driving unit 12 applies driving force either directly or indirectly to a drive wheel that is at least one of the plurality of wheels 23. In this embodiment, the plurality of wheels 23 are all drive wheels as described above, and therefore, the driving unit 12 applies driving force to all of those wheels 23. The driving unit 12 is built in the vehicle body 21. The driving unit 12 includes an electric motor (motor), for example, and applies the driving force generated by the electric motor to the wheels 23 indirectly via a gearbox, a belt, and other members. Alternatively, the driving unit 12 may also be configured to apply the driving force directly to the respective wheels 23 as in an in-wheel motor. The driving unit 12 drives, in response to a control signal from the processing unit 30, the respective wheels 23 in rotational directions and rotational velocities specified by the control signal.

The lift-up mechanism 13 is a mechanism for lifting the object X1 by elevating the respective elevator plates 22. In other words, the lift-up mechanism 33 serves as a holding mechanism for holding the object X1 by lifting the object X1. In this embodiment, the lift-up mechanism 33 elevates or lowers the upper surface of each elevator plate 22 (i.e., the load platform) by moving the elevator plate 22 up and down with respect to the vehicle body 21. The lift-up mechanism 33 moves the elevator plate 22 between a lower-limit position and an upper-limit position of the movable range of the elevator plate 22. The lift-up mechanism 33 is built in the body 2 so as to be located between the vehicle body 21 and the elevator plate 22.

Optionally, the carrier 1 may further include, as appropriate, other additional constituent elements such as a charger circuit for a storage battery.

(2.3) Control System

The control system 3 includes a processing unit 30, a storage unit 31, and a communications unit 32 as shown in FIG. 3. The processing unit 30 includes an acquisition unit 301, a control unit 302, a shift decision unit 303, and a decision unit 304. The acquisition unit 301, the control unit 302, the shift decision unit 303, and the decision unit 304 are implemented as respective functions of the processing unit 30.

The processing unit 30 includes, as a major constituent element, a computer system including one or more processors and one or more memories. The computer system performs the function of the processing unit 30 by making the processor of the computer system execute a program stored in the memory of the computer system. The program may be stored in the memory. Alternatively, the program may also be downloaded via a telecommunications line such as the Internet or distributed after having been stored in a non-transitory storage medium such as a memory card.

The acquisition unit 301 performs acquisition processing. The acquisition processing is processing of acquiring a result of detection by the detection unit 11 of the carrier (mover) 1. The result of detection by the detection unit 11 includes distance information about the distance between the carrier 1 and the object X1 as described above. The acquisition unit 301 acquires, as needed, the result of detection from the detection unit 11.

The control unit 302 performs first estimation processing and second estimation processing. The first estimation processing is the processing of estimating, by recognizing at least some of the plurality of feature portions X10 based on the result of detection by the detection unit 11, the location and orientation of the object X1 based on a result of the recognition. In this embodiment, the first estimation processing is supposed to be estimating the location and orientation of the object X1 by recognizing all of the plurality of feature portions X10. The second estimation processing is the processing of estimating, by recognizing at least some of the plurality of feature portions X10 based on the result of detection by the detection unit 11, the type of the object X1 based on a result of the recognition.

When performing the first estimation processing, the control unit 302 estimates the relative location of each of the plurality of feature portions X10 with respect to the carrier 1 by recognizing the plurality of feature portions X10 based on the result of detection by the detection unit 11. In this case, the processing unit 30 may estimate the location of the body 2 (i.e., the carrier 1) based on the result of detection by the detection unit 11 as described above. Thus, the control unit 302 may estimate the location and orientation of the object X1 based on these locations estimated. That is to say, the processing (first estimation processing) of estimating the location and orientation of the object X1 uses information about the relative location of the object X1 (e.g., the feature portions X10 in this case) with respect to the carrier (mover) 1.

When performing the second estimation processing, the control unit 302 recognizes at least some of the plurality of feature portions X10 (e.g., wheels in this example as will be described later) based on the result of detection by the detection unit 11. Then, the control unit 302 estimates, based on, for example, the shapes, dimensions, or designs of the feature portions X10 recognized, the type of the object X1 corresponding to the feature portions X10. As used herein, the "type" of the object X1 may refer to, for example, the product type of the object X1, the shape of the object X1, the dimensions of the object X1, the maximum payload of the object X1, or the design of the object X1. As an example, the product type of the object X1 may refer to the classification by the function unique to the object X1 such as a roll box pallet or a flat pallet. In this embodiment, even if two objects X1 are of the same product type such as a roll box pallet but have mutually different maximum payloads, for example, then the two objects X1 are regarded as being of two different types.

Specifically, information about a plurality of models respectively corresponding to multiple types of objects X1 is stored in the storage unit 31. Each of the plurality of models includes a template representing its associated feature portion X10. Thus, when performing the second estimation processing, the control unit 302 searches, based on the result of recognition of the feature portions X10, the plurality of templates stored in the storage unit 31 for a matching template. This allows the control unit 302 to estimate the type of the object X1 corresponding to the feature portions X10 recognized.

In addition, the control unit 302 also performs holding processing and carrying processing. In other words, the mover control method includes the holding processing and the carrying processing. The holding processing is processing of having the object X1 held by the carrier 1 by making the carrier (mover) 1 enter the gap under the object X1 and having the object X1 lifted by the carrier 1. Specifically, in performing the holding processing, the control unit 302 makes the carrier 1 slip into the gap under the object X1 (roll box pallet) by controlling the driving unit 12. Then, in performing the holding processing, the control unit 302 controls the lift-up mechanism 13 to raise the respective elevator plates 22, thereby having the object X1 lifted by the carrier 1. The carrying processing is the processing of making the carrier 1 move to its destination with the object X1 held by the carrier (mover) 1. Specifically, when performing the carrying processing, the control unit 302 controls the driving unit 12 to make the carrier 1 holding the object X1 thereon move to its destination along the traveling route C1 (see FIG. 1) set by the high-order system 4.

In addition, the control unit 302 also performs control processing. The control processing is the processing of controlling the carrier (mover) 1 and includes various types of processing. In this embodiment, the control processing is roughly classified into three types of control processing (namely, first control processing, second control processing, and third processing) to be respectively performed in three different situations.

The second control processing is processing to be performed while the carrier 1 is being moved to the object X1. Specifically, the second control processing is processing of controlling the carrier (mover) 1 based on the detection result by the detection unit 11, on recognizing some of a plurality of feature portions X10 of the object X1 to estimate the location and orientation of the object X1. The second control processing is performed in parallel with the first estimation processing.

In this embodiment, the object X1 is a roll box pallet as described above. In addition, in this embodiment, the plurality of (e.g., four in this example) wheels of the roll box pallet respectively correspond to the plurality of feature portions X10. In other words, the plurality of feature portions X10 include the legs (wheels) of the object X1 (roll box pallet). That is to say, in this embodiment, the second control processing is processing of controlling the mover 1 based on the detection result by the detection unit 11, on recognizing some of the plurality of wheels of the roll box pallet. The second control processing is performed to make the carrier 1 move to the object X1, i.e., to make the carrier 1 ready to slip into the gap under the object X1. A specific implementation of the second control processing will be described later in the "(3.1) First operation example" section.

The third control processing is processing to be performed while the carrier 1 is being made to move to the object X1 (more specifically, while the carrier 1 is starting to move toward the object X1). Specifically, the third control processing is processing of controlling the carrier (mover) 1 when a decision is made by a shift decision unit 303 to be described later (i.e., as a result of the shift decision processing) that the object X1 should have shifted. The third control processing is performed to make the carrier 1 move to the object X1 (i.e., to make the carrier 1 ready to slip into the gap under the object X1) even if the object X1 has shifted due to vibrations, for example, while the carrier 1 is moving to the object X1. A specific implementation of the third control processing will be described later in the "(3.2) Second operation example" section.

The first control processing is processing to be performed while the carrier 1, holding the object X1 thereon, is carrying the object X1 to its destination. Specifically, the first control processing is processing of controlling the carrier (mover) 1 when a decision unit 304 to be described later has decided (i.e., as a result of decision processing) that the carrier 1 should be going to deviate from its traveling route C1. The first control processing is performed to make the carrier 1 move to its destination such that the mover 1, as well as the object X1, does not deviate from the traveling route C1 while the carrier 1, holding the object X1 thereon, is carrying the object X1 to its destination. A specific implementation of the first control processing will be described later in the "(3.3) Third operation example" section.

The shift decision unit 303 performs shift decision processing. The shift decision processing is processing of determining whether or not the object X1 has shifted while the carrier (mover) 1 is moving to the object X1. The shift decision processing is performed as needed while the carrier 1 is moving toward the object X1. A specific implementation of the shift decision processing will be described later in the "(3.2) Second operation example" section.

The decision unit 304 performs decision processing. The decision processing is the processing of determining whether or not the carrier (mover) 1 that is carrying the object X1 thereon is going to deviate from the traveling route C1. The traveling route C1 is a route, through which the carrier 1, as well as the object X1, is allowed to pass. The decision processing is performed as needed while the carrier 1 holding the object X1 thereon is carrying the object X1 to its destination. A specific implementation of the decision processing will be described later in the "(3.3) Third operation example" section.

The communications unit 32 communicates with the high-order system 4 either directly or indirectly over a network or via a relay, for example. As the method of communication between the communications unit 32 and the high-order system 4, any appropriate wireless or wired communication method may be adopted. In this embodiment, the communications unit 32 adopts a wireless communication method using a radio wave as a communications medium and compliant with a standard such as Wi-Fi®, Bluetooth®, ZigBee®, or low-power radio (specific low power radio) standard that requires no licenses.

(3) Operation

Next, it will be described how the mover control system 100 according to this embodiment operates. First, a basic operation example of the mover control system 100 will be described. In the following example, suppose a situation where the object X1 (roll box pallet) placed in a roll box place for pallets is going to be carried by the carrier 1.

Also, in this basic operation example, suppose the control unit 302 performs none of the first, second, or third control processing. That is to say, suppose in this basic operation example, when performing the first estimation processing for the first time after having arrived at a place before the object X1, the carrier 1 recognizes all of the feature portions X10 (e.g., wheels) of the object X1. In addition, suppose, in this basic operation example, that the object X1 does not shift while the carrier 1 is moving to the object X1. Furthermore, suppose, in this basic operation example, the carrier 1, carrying the object X1 to its destination while holding the object X1 thereon, does not deviate from the traveling route C1.

First, in accordance with an instruction (carry instruction) given by the high-order system 4 and the electronic map, the control system 3 makes the carrier 1 move toward a target node C0 which is set in the vicinity of the place for pallets. At this time, the carrier 1 travels along the traveling route C1 set by the high-order system 4. When arriving at the target node C0, the control system 3 decides that the carrier 1 should have arrived at the place for pallets to bring the carrier 1 to a halt. At this time, the operation mode of the control system 3 changes into an independent mode. As used herein, the "independent mode" is an operation mode of the control system 3 in which the control system 3 may control the carrier 1 by itself without following an instruction given by the high-order system 4. The control system 3 that has entered the independent mode performs the acquisition processing and the first estimation processing with the carrier 1 kept stopped on the target node C0. In this case, since the detection unit 11 (sensor 110) has captured the object X1, the control system 3 acquires the result of detection by the detection unit 11 with respect to the object X1 when performing the acquisition processing.

When performing the first estimation processing, the control system 3 estimates the relative location of each of the plurality of feature portions X10 with respect to the carrier 1 by recognizing the plurality of feature portions X10 based on the result of detection by the detection unit 11. In this case, all of the feature portions X10 are recognized through this first estimation processing as described above. Thus, the control system 3 estimates the location and orientation of the object X1 by performing this first estimation processing. At this time, the control system 3 estimates the type of the object X1 by performing the second estimation processing as well as the first estimation processing.

Thereafter, the control system 3 performs holding processing. First, the control system 3 sets, based on the results of estimation of the location, orientation, and type of the object X1, the location of the object X1 (e.g., the location of a point under the object X1) at a target location. Then, the control system 3 makes the carrier 1 move to the target location (i.e., to the object X1). At this time, the control system 3 determines, based on the relative locations of the carrier 1 and the object X1, whether the carrier 1 is made to move to the object X1 by making the carrier 1 turn and move forward in combination or draw a curved track. Then, the control system 3 makes the carrier 1 move to the object X1 in the pattern selected. As a result, the carrier 1 turns slipped into the gap under the object X1. When the carrier 1 finishes moving, the control system 3 controls the lift-up mechanism 13 to elevate the respective elevator plates 22. Consequently, the carrier 1 turns into the position of lifting and holding the object X1.

Then, the control system 3 performs the carrying processing. Specifically, the control system 3 controls the driving unit 12 to make the carrier 1, holding the object X1 thereon, move to its destination along the traveling route C1 set by the high-order system 4.

(3.1) First Operation Example

Next, a first operation example of the mover control system 100 according to this embodiment will be described.

The first operation example relates to an exemplary operation to be performed in a situation where only some of the plurality of feature portions X10 (wheels) are recognizable in the first estimation processing of the basic operation example.

Figure 5A:
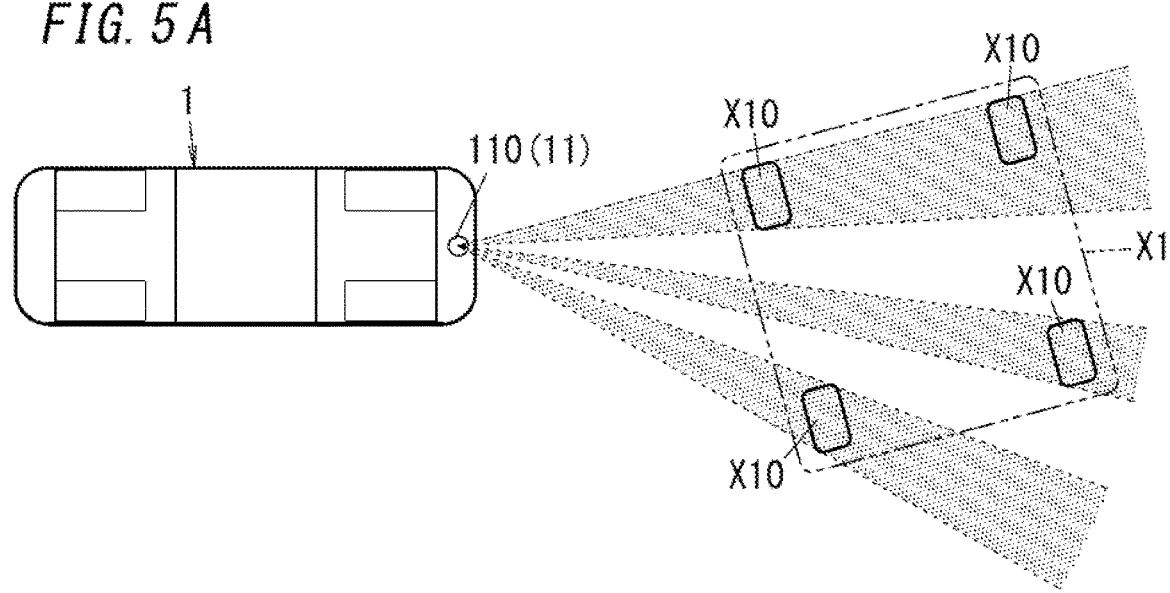
FIGS. 5A and 5B are schematic plan views illustrating a mover and an object in the first operation example of the mover control system.
Figure 5B:
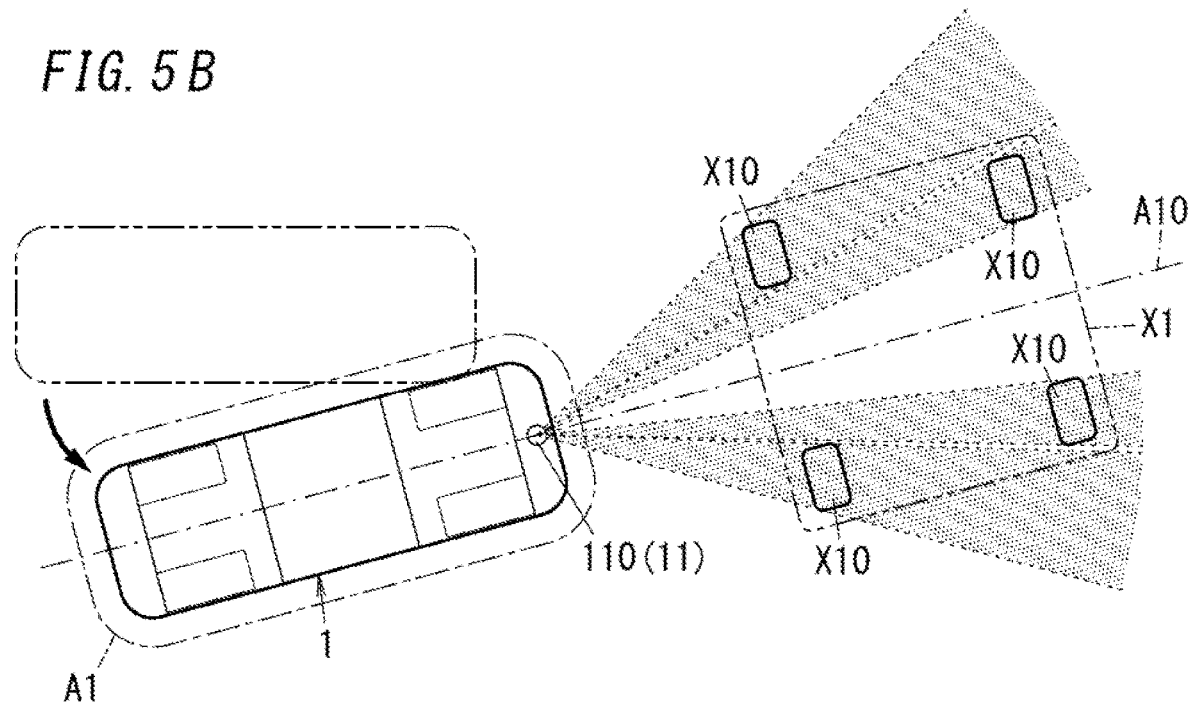

For example, the detection unit 11 (sensor 110) of the carrier 1 projects light (a laser beam) toward a region defined to form a predetermined angle with respect to the detection unit 11 as a vertex as shown in FIGS. 5A and 5B. In FIGS. 5A and 5B, the dotted lines extended from the sensor 110 represent the light projected from the sensor 110. The same statement also applies to FIG. 6 to be referred to later. In addition, the detection unit 11 may measure, when the projected light is reflected from any of the feature portions X10, the distance to the feature portion X10 based on the reflected light, i.e., may recognize the feature portion X10.

In this case, if the detection unit 11 and a plurality of (e.g., two in this example) feature portions X10 are arranged in line as shown in FIG. 5A, for example, then the light projected from the detection unit 11 is reflected from one feature portion X10, located closer to the detection unit 11, out of the plurality of feature portions X10. In that case, the light that would otherwise reach the rest of the plurality of feature portions X10 is cut off by the feature portion X10 located closer to the detection unit 11. That is to say, in such a situation, the detection unit 11 may receive the light reflected from only some of the plurality of feature portions X10 (e.g., the feature portion X10 located closer to the detection unit 11 in this example), and therefore, may recognize only some of the plurality of feature portions X10 as a result.

Thus, in this first operation example, the control system 3 performs the second control processing. That is to say, in this first operation example, when the control system 3 recognizes, based on the result of detection by the detection unit 11, some of the plurality of feature portions X10, the control system 3 controls the carrier 1. In this operation example, the control system 3 performs, as exemplary second control processing, the processing of making the carrier 1 move to a location where all of the plurality of feature portions X10 would be recognizable. In other words, the control processing (second control processing) includes sub-processing of making the carrier (mover) 1 move to the location where all of the plurality of feature portions X10 of the object X1 would be recognizable.

Figure 4:
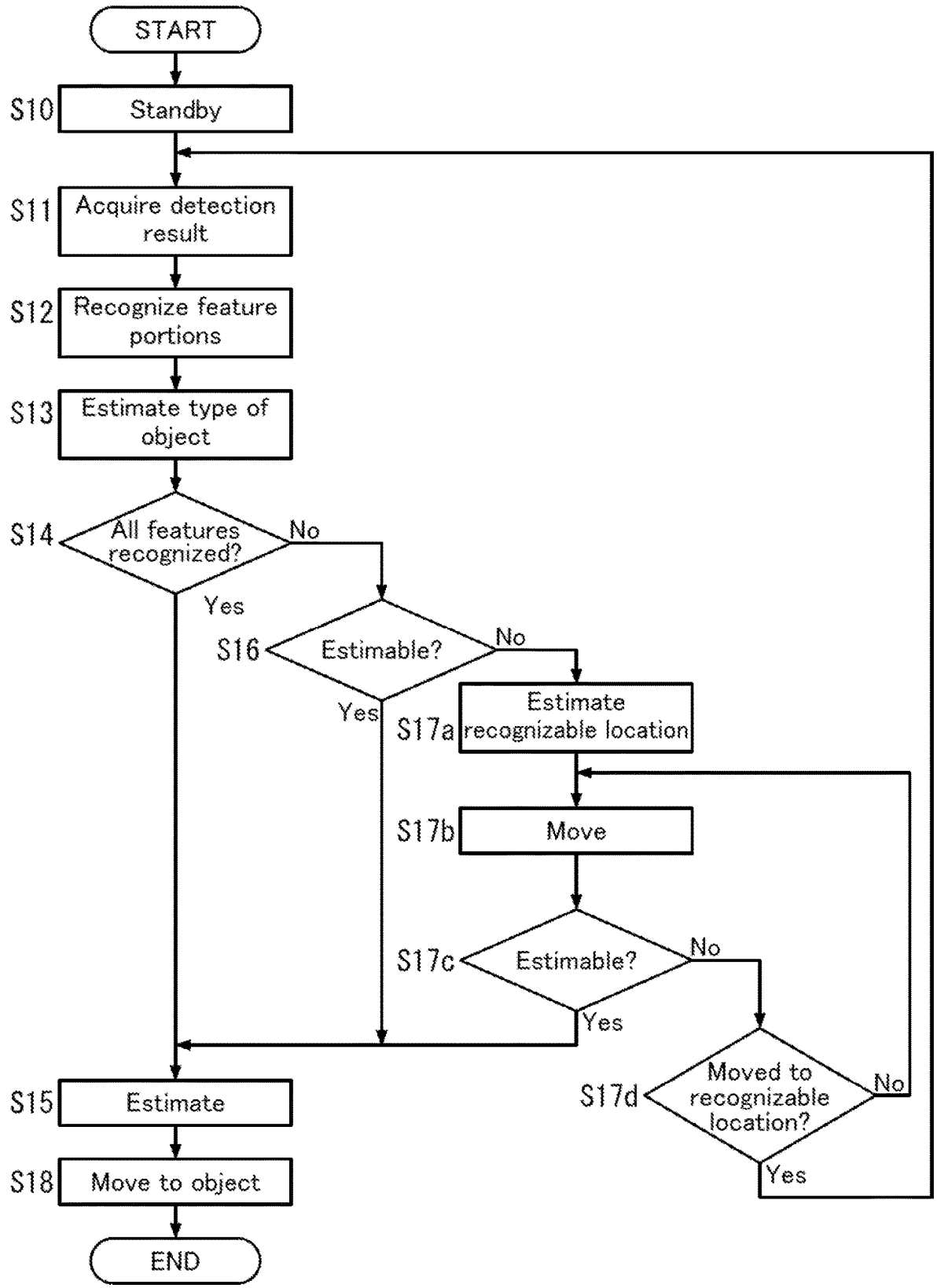
FIG. 4 is a flowchart showing a first operation example of the mover control system.

Next, a series of processing steps to be performed in the first operation example by the mover control system 100 according to this embodiment will be described with reference to FIG. 4. In the flowchart shown in FIG. 4, the processing step to be performed when the answer is YES in Step S16 and the processing steps S15 and S18 or the processing step to be performed when the answer is NO in Step S16 and the series of processing steps S17a-S17d, S15, and S18 correspond to the second control processing. The first operation example shown in FIG. 4 is started when the carrier 1 reaches the target node C0 which is set in the vicinity of the place for pallets.

First, when the carrier 1 reaches the target node C0, the control system 3 brings the carrier 1 to a halt and makes the carrier 1 enter a standby mode (in S10). Then, the control system 3 changes its operation mode into the independent mode. Thereafter, the control system 3 performs acquisition processing to acquire the result of detection by the detection unit 11 (sensor 110) (in S11). Thus, the control system 3 acquires the result of detection by the detection unit 11 about one or more feature portions X10 of the object X1.

Next, the control system 3 performs the first estimation processing. That is to say, the control system 3 attempts to recognize, based on the result of detection by the detection unit 11, all of the feature portions X10 of the object X1 (in S12). Then, the control system 3 performs the second estimation processing in parallel with the first estimation processing. Specifically, the control system 3 searches, based on the result of recognition of the feature portions X10 in the first estimation processing, the plurality of templates stored in the storage unit 31 for a matching template, thereby estimating the type of the object X1 (in S13).

In this example, in the first estimation processing, if the control system 3 has recognized all of the feature portions X10 successfully (if the answer is YES in S14), the control system 3 estimates, based on the results of recognition of all of those feature portions X10, the location and orientation of the object X1 (in S15). Meanwhile, in the first estimation processing, if the control system 3 is able to recognize only some of the feature portions X10 (if the answer is NO in S14) but may estimate, based on the results of recognition of some of the feature portions X10, the location and orientation of the object X1 (if the answer is YES in S16), then the control system 3 estimates the location and orientation of the object X1 (in S15). Such a situation arises when the majority of the plurality of feature portions X10 (e.g., three out of the four wheels) may be recognized, more suitably, when all of these feature portions X10 have the same state (e.g., when all of the three wheels have the same orientation).

On the other hand, in the first estimation processing, if only some of the feature portions X10 are recognizable (if the answer is NO in S14) and the location and orientation of the object X1 cannot be estimated based on only the results of recognition of some of the feature portions X10 (if the answer is NO in S16), then the control system 3 performs the sub-processing. Such a situation may arise when only a half or less of the plurality of feature portions X10 (e.g., two out of the four wheels) are recognizable.

When performing the sub-processing, the control system 3 estimates, based on the results of recognition of some of the feature portions X10, a location where all of those feature portions X10 are recognizable (hereinafter referred to as a "recognizable location") (in S17a). Then, the control system 3 makes the carrier 1 move to the recognizable location thus estimated (in S17b).

For example, suppose the detection unit 11 (sensor 110) is receiving the light reflected from two feature portions X10, facing the detection unit 11, out of a plurality of (e.g., four in this example) feature portions X10 (wheels) as shown in FIG. 5A. In that case, the control system 3 estimates, as the recognizable location, an area A1 which is located on a normal A10, passing through the center of a line segment connecting together the two feature portions X10 recognized and facing the detection unit 11, and which is also located at a predetermined distance from the object X1. Then, the control system 3 makes the carrier 1 move to the recognizable location as shown in FIG. 5B.

Specifically, the control system 3 makes the carrier 1 turn (to the right in this example) such that the sensor 110 faces the area A1. Then, the control system 3 makes the carrier 1 move forward to the point that the center of the carrier 1 substantially agrees with the center of the area A1. Thereafter, the control system 3 makes the carrier 1 turn (to the left in this example) to the point that the sensor 110 is located on the normal A10. In this manner, the control system 3 makes the carrier 1 move to the area A1 (i.e., the recognizable location) by making the carrier 1 turn and move forward in combination. Then, at the recognizable location, the light projected from the detection unit 11 (sensor 110) is able to reach all of the feature portions X10. Thus, the control system 3 performs the acquisition processing (in S11) and the first estimation processing (in S12) all over again in a state where the carrier 1 is located at the recognizable location, thereby making all of the feature portions X10 recognizable. If not all of the feature portions X10 are still recognizable by the detection unit 11, then the control system 3 may change the recognizable location by performing the sub-processing (S17a-S17d).

Then, after the location and orientation of the object X1 have been estimated, the control system 3 sequentially performs the holding processing and the carrying processing as in the basic operation example described above. That is to say, the control system 3 makes the carrier 1 move to the target location (i.e., to the object X1) (in S18).

This operation example has the following advantage over a method in which the carrier (mover) 1 is not allowed to move unless all of the feature portions X10 of the object X1 are recognized (i.e., a mover control method according to a first comparative example). Specifically, the mover control method according to the first comparative example requires taking some measures for increasing the recognition accuracy of the carrier 1 by, for example, increasing the number of the sensors 110 for use in the detection unit 11 in order to recognize all of the feature portions X10. In addition, the mover control method according to the first comparative example requires taking some measures to modify the arrangement of the object X1 so that all of the feature portions X10 are recognizable more easily.

In contrast, this operation example takes advantage of the fact that the carrier 1 may travel autonomously. That is to say, this operation example allows taking some measures for making the carrier 1 move to the object X1 even without taking the measures described above such as making the carrier 1 move to the location where the feature portions X10 are easily recognizable (i.e., the recognizable location) at a point in time when some of the feature portions X10 are recognized. In other words, this operation example has the advantage of allowing the carrier 1 to move smoothly to the object X1.

In this case, if the object X1 is placed at a predetermined location by a machine in a stage before the carrier 1 carries the object X1, then the object X1 may be arranged by the machine at a generally accurate location to have a generally accurate orientation. In that case, the carrier 1 may slip into the gap under the object X1 just by moving forward after having reached the target node C0. On the other hand, if the object X1 is placed at a preset location by a human, then the object X1 may be arranged to fall outside, or be tilted with respect to, the predetermined location depending on how carefully the person in charge of carrying the object X1 has done the job. In that case, a situation may arise where the object X1 cannot slip into the gap under the object X1 simply by moving forward after having reached the target node C0.

According to this operation example, even in the latter case, the carrier 1 may slip into the gap under the object X1 after having reached the target node C0. That is to say, this operation example has the advantage of requiring no accuracy in arranging the object X1 for the person who carries the object X1 to the predetermined location.

In this operation example, the control system 3 performs the acquisition processing and the first estimation processing as needed while performing the sub-processing. Thus, the control system 3 is sometimes able to estimate the location and orientation of the object X1 while making the carrier 1 move to the recognizable location. In that case (if the answer is YES in S17c), even while performing the sub-processing, the control system 3 may abort the sub-processing to start performing the holding processing and the carrying processing (i.e., may make the carrier 1 move to the object X1 (in S18)) at a point in time when the location and orientation of the object X1 may be estimated (in S15). On the other hand, if the control system 3 cannot estimate the location and orientation of the object X1 while performing the sub-processing (if the answer is NO in S17c), then the control system 3 allows the carrier 1 to move continuously (in S17b) until the carrier 1 finishes moving to the recognizable location (if the answer is NO in S17d). Meanwhile, when the carrier 1 has finished moving to the recognizable location (if the answer is YES in S17d), then the control system 3 performs the acquisition processing (in S11) and the first estimation processing (in S12) all over again.

That is to say, the control processing (second control processing) includes the main processing (S18) of making the carrier (mover) 1 move to the object X1. Optionally, when the location and orientation of the object X1 are estimated halfway through the sub-processing (if the answer is YES in S17c, or in S15), then the main processing may be performed.

As can be seen, the main processing is also performed as a part of holding processing (i.e., the processing of making the carrier 1 slip into the gap under the object X1). Thus, when performing the main processing, the control system 3 may perform the holding processing just by having the object X1 lifted and held by the carrier 1.

The main processing (S18) is also performed when the second control processing includes the processing step to be performed if the answer is YES in S16 or the processing step S15. Specifically, the main processing is also performed when the location and orientation of the object X1 may be estimated by recognizing only some of the feature portions X10, not all of those feature portions X10. That is to say, the control processing (second control processing) includes the main processing. In addition, the main processing may be performed when the location and orientation of the object X1 are estimated based on the results of recognition of some of the feature portions X10.

Figure 6:
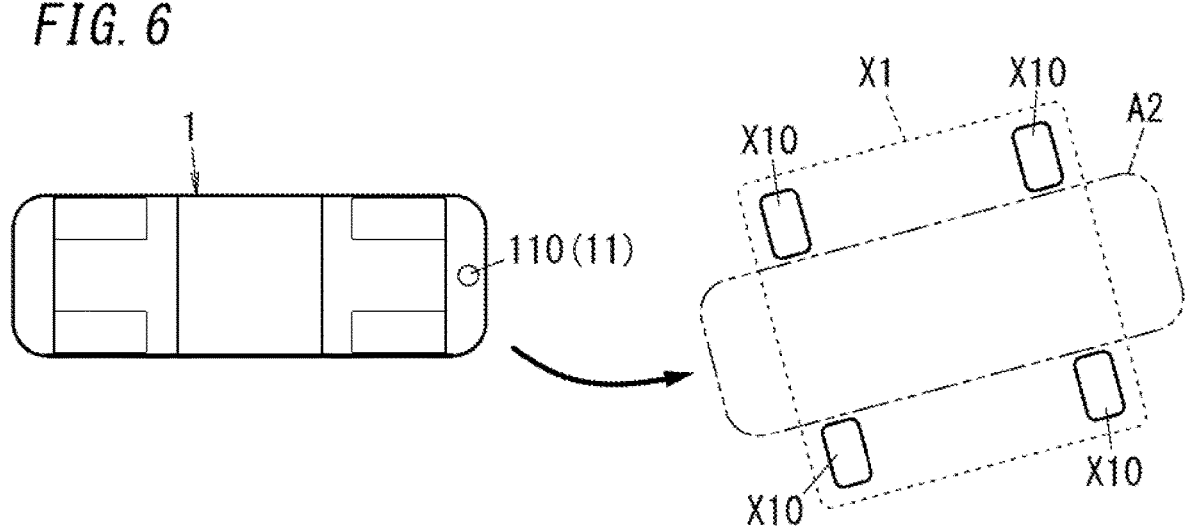
FIG. 6 is a schematic plan view illustrating a mover and an object in the first operation example of the mover control system.

When performing the main processing, the control system 3 may make the carrier 1 slip into the gap under the object X1 by either making the carrier 1 turn and move forward in combination or making the carrier 1 move to draw a curved track as shown in FIG. 6, whichever is appropriate. In the example illustrated in FIG. 6, the control system 3 makes the carrier 1 move directly to an area A2 under the object X1 without making the carrier 1 move to the recognizable location. That is to say, the main processing may include the processing of making the carrier (mover) 1 move to draw a curved track.

(3.2) Second Operation Example

Next, a second operation example of the mover control system 100 according to this embodiment will be described. The second operation example is an exemplary operation to be performed, as the holding processing of the basic operation example, while the carrier 1 is being made to move to the object X1.

The object X1 may shift while the carrier 1 is being made to move to the object X1, for example. As used herein, the "shift of the object X1" may also refer to a slight shift in the location and orientation of the object X1 which have been estimated through the first estimation processing. Therefore, modes of shift of the object X1 may naturally include a shift of the entire object X1 but also a shift of only a part (feature portions X10) of the object X1 as well. The shift of the object X1 may be caused not only when the object X1 is subjected to external force (e.g., when a person at work touches the object X1) but also when the object X1 shifts by itself following the gravity depending on the status of an installation surface of the object X1 (e.g., when the installation surface is tilted).

Figure 7:
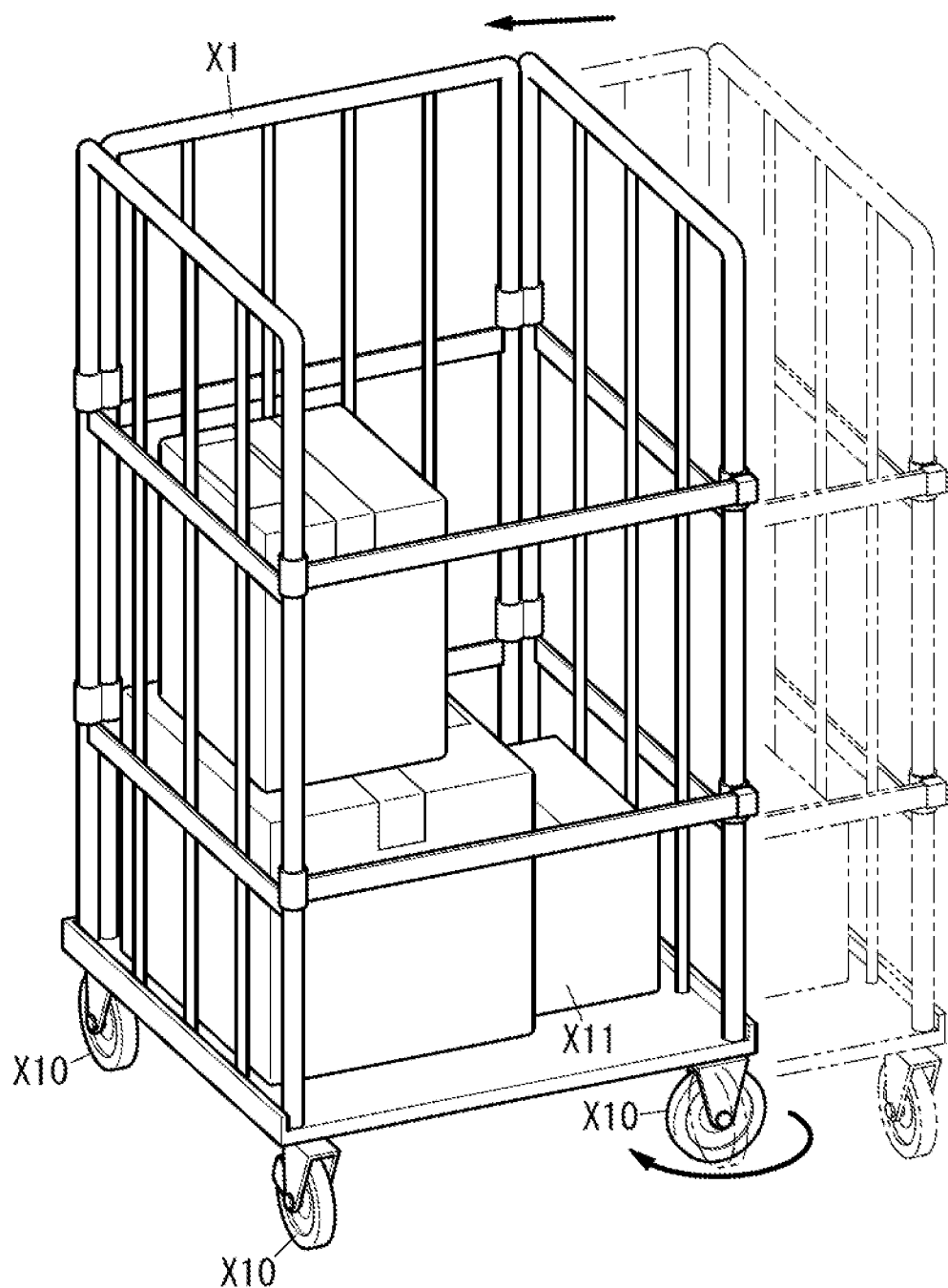
FIG. 7 is a perspective view illustrating the appearance of the object in a situation where the object has shifted.

For example, suppose the object X1 is a roll box pallet as shown in FIG. 7. The shift of the object X1 may naturally be a shift of the entire roll box pallet but may also be a shift of the roll box pallet due to rotation of the wheels (feature portions X10) of the roll box pallet on the spot. In the latter case, the wheels are so-called "casters." The casters are wheels, of which the traveling direction is not fixed but may be changed arbitrarily. The casters are each configured to be rotatable around a point at which the caster is attached to the body of the roll box pallet. Thus, the rotation of the casters may cause the feature portions X10 to shift even if the location of the entire object X1 remains unchanged.

If the object X1 has shifted while the carrier 1 is being made to move to the object X1, then the location and orientation of the object X1 are different from the ones estimated through the first estimation processing. In that case, if the control system 3 lets the carrier 1 move continuously toward the object X1, then the carrier 1 may fail to reach the object X1 or may collide against the object X1 because the location and orientation of the object X1 are different from the estimated ones. That is to say, the control system 3 may be unable to achieve the object of making the carrier 1 move to the object X1 (e.g., making the carrier 1 enter the gap under the object X1).

Thus, according to this second operation example, the control system 3 performs shift decision processing. Specifically, in this second operation example, the control system 3 determines whether or not the object X1 has shifted while the carrier 1 is being made to move to the object X1. In this operation example, the control system 3 continues to monitor the plurality of feature portions X10 (wheels) of the object X1 by acquiring, as needed, the results of detection by the detection unit 11 (sensor 110) (i.e., by performing the acquisition processing as needed). Then, the control system 3 determines, based on a move of one or more feature portions X10 out of the plurality of feature portions X10, whether or not the object X1 has shifted. That is to say, the shift decision processing determines, based on the move of one or more monitor targets out of the plurality of monitor targets (feature portions X10) included in the object X1, whether or not the object X1 has shifted.

In addition, according to the second operation example, the control system 3 also performs third control processing. That is to say, in the second operation example, if a decision is made as a result of the shift decision processing that the object X1 should have shifted, the control system 3 controls the carrier 1. In this operation example, the control system 3 may perform the third control processing by, for example, attempting the processing of modifying the track of the carrier 1 toward the object X1 and then making the carrier 1 move to the object X1 again. In other words, the control processing (third control processing) includes retry processing including modifying the track of the carrier (mover) 1 toward the object X1 and then making the carrier 1 move to the object X1 along the modified track.

Figure 8:
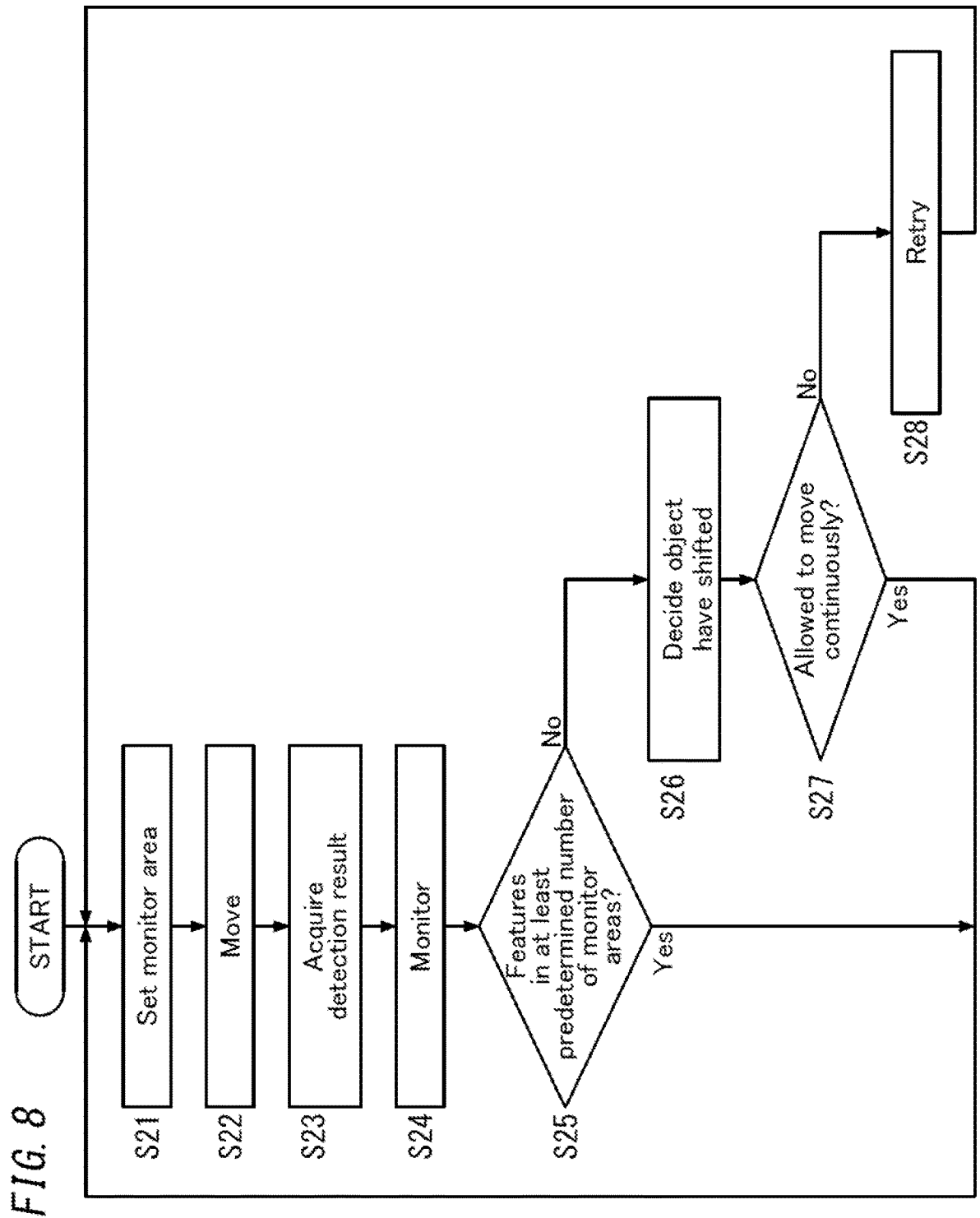
FIG. 8 is a flowchart showing a second operation example of the mover control system.

Next, a series of processing steps to be performed in this second operation example by the mover control system 100 according to this embodiment will be described with reference to FIGS. 8-15C. In the flowchart shown in FIG. 8, the processing steps S21 and S23-S26 correspond to the shift decision processing and the processing steps S27 and S28 correspond to the third control processing. The second operation example shown in FIG. 8 is started at a point in time when the control system 3 has estimated the location and orientation of the object X1 through the first estimation processing.

First, when finishing estimating the location and orientation of the object X1, the control system 3 starts performing the holding processing as described above. Specifically, the control system 3 starts performing the processing of making the carrier 1 move to the object X1 while setting, based on the results of estimation of the location, orientation, and type of the object X1, the location of the object X1 (e.g., the gap under the object X1 in this example) as a target location. At this time, before starting performing the holding processing, the control system 3 sets the monitor areas B1 (see FIG. 9) (in S21).

Specifically, as shown in FIG. 9, the control system 3 sets the monitor area B1 for each of the plurality of feature portions X10 recognized through the first estimation processing. As used herein, each "monitor area" refers to a certain area covering its associated feature portion X10 in its entirety. That is to say, the number of the monitor areas B1 provided agrees with the number of the feature portions X10. In addition, as used herein, "setting each monitor area" means that the control system 3 defines a certain range, covering the location (coordinates) of the associated feature portion X10 (i.e., the monitor area B1), to be a monitor target. That is to say, the number of the monitor targets agrees with the number of plurality of feature portions X10.

When finishing setting the monitor areas B1, the control system 3 starts making the carrier 1 move toward the object X1 (in S22). While the carrier 1 is moving toward the object X1, the control system 3 acquires the detection results by the detection unit 11 as needed (i.e., performs the acquisition processing as needed) (in S23). Then, the control system 3 sees, as needed, if the locations of the plurality of feature portions X10 based on the detection results by the detection unit 11 fall within their associated monitor areas B1 (in S24). That is to say, the shift decision processing is performed to determine, based on the results of detection by the detection unit 11 included in the carrier (mover) 1, whether or not the object X1 has shifted.

Specifically, the control system 3 sees if the feature portions X10 respectively fall within at least a predetermined number of their associated monitor areas B1 (in S25). In this embodiment, the plurality of feature portions X10 (wheels) are all casters. In other words, the one or more monitor targets include casters. Therefore, according to this embodiment, not only when the object X1 moves in its entirety but also when the casters turn, any of the feature portions X10 may fall outside its associated monitor area B1 (see FIGS. 10 and 11).

In this operation example, when finding the number of the feature portions X10 falling within their associated monitor areas B1 greater than a half of the number of the feature portions X10, the control system 3 decides that the object X1 should not have shifted. On the other hand, when finding the number of the feature portions X10 falling within their associated monitor areas B1 equal to or less than a half of the number of the feature portions X10, the control system 3 decides that the object X1 should have shifted.

In the example illustrated in FIG. 10, the feature portions X10 fall within three out of their associated four monitor areas B1. Thus, in the example illustrated in FIG. 10, the number of the feature portions X10 falling within their associated monitor areas B1 is three, which is more than a half of four that is the number of the feature portions X10, and therefore, the control system 3 decides that the object X1 should not have shifted. On the other hand, in the example illustrated in FIG. 11, the feature portions X10 fall within two out of their associated four monitor areas B1. Thus, in the example illustrated in FIG. 11, the number of the feature portions X10 falling within their associated monitor areas B1 is two, which is equal to or less than a half of four that is the number of the feature portions X10, and therefore, the control system 3 decides that the object X1 should have shifted.

As shown in FIG. 8, when finding the feature portions X10 falling within at least the predetermined number of associated monitor areas B1 (if the answer is YES in S25), the control system 3 lets the carrier 1 move continuously toward the object X1 (in S22). On the other hand, when finding the feature portions X10 not falling within at least the predetermined number of associated monitor areas B1 (if the answer is NO in S25), the control system 3 decides that the object X1 should have shifted (in S26). Then, the control system 3 determines whether or not the carrier 1 may continue to move toward the object X1 even without modifying the track of the carrier 1 (in S27).

Specifically, the control system 3 determines, by seeing if at least one some of the feature portions X10 overlap with a preset target area (i.e., the area encircled with the two-dot chain) as shown in FIGS. 12 and 13, whether or not the carrier 1 may continue to move toward the object X1 In the example illustrated in FIG. 12, none of the feature portions X10 overlaps with the preset target area, and therefore, the control system 3 decides that the carrier 1 should be allowed to continue to move toward the object X1. On the other hand, in the example illustrated in FIG. 13, one of the feature portions X10 overlaps with the preset target area, and therefore, the control system 3 decides that the carrier 1 should not be allowed to continue to move toward the object X1.

As shown in FIG. 8, when deciding that the carrier 1 should be allowed to continue to move toward the object X1 (if the answer is YES in S27), the control system 3 lets the carrier 1 move continuously toward the object X1 (in S22). On the other hand, when deciding that the carrier 1 should not be allowed to continue to move toward the object X1 (if the answer is NO in S27), the control system 3 performs retry processing (in S28). In this operation example, the control system 3 performs two types of processing (namely, first retry processing and second retry processing) as the retry processing.

The first retry processing is the processing including making the carrier 1 return to a point where the carrier 1 was located before starting to move toward the target area, resetting the target area after having gone through the acquisition processing and the first estimation processing, and then making the carrier 1 move to the object X1. That is to say, the retry processing includes processing of making the carrier (mover) 1 return to the starting point where the carrier (mover) 1 started moving toward the object X1 before modifying its track.

A specific example of the first retry processing will be described with reference to FIGS. 14A-14D. Suppose, in the example shown in FIGS. 14A-14C, the object X1 has shifted in its entirety while the carrier 1 is moving toward the object X1. FIG. 14A illustrates the relative locations of the carrier 1 and the object X1 at a point in time when the carrier 1 has just started to move toward the object X1. At this point in time, the object X1 has not shifted yet. FIG. 14B illustrates a situation where the object X1 has shifted while the carrier 1 is moving toward the object X1. At this point in time, the control system 3 performs the shift decision processing to decide that the object X1 should have shifted. FIG. 14C illustrates a situation where the control system 3 has performed the first retry processing to make the carrier 1 return to a point where the carrier 1 was located before starting to move toward the target area (i.e., the point where the carrier 1 is located in FIG. 14A). FIG. 14D illustrates the relative locations of the carrier 1 and the object X1 at a point in time when the control system 3 has performed the first retry processing to start the processing of resetting the target area at location where the object X1 that has moved is present and making the carrier 1 move toward the object X1 all over again. The first retry processing may be performed, for example, in a situation where it is difficult to modify the track at a point where a decision is made that the object X1 should have shifted.

The second retry processing is the processing of resetting, via the acquisition processing and the first estimation processing, a target area again at a point where a decision is made that the object X1 should have shifted to make the carrier 1 move to the object X1. That is to say, the retry processing includes processing of making the carrier (mover) 1 move to the object X1 so as to follow the object X1 that has shifted.

A specific example of the second retry processing will be described with reference to FIGS. 15A-15C. Suppose, in the example shown in FIGS. 15A-15C, the object X1 has shifted in its entirety while the carrier 1 is moving toward the object X1. FIG. 15A illustrates the relative locations of the carrier 1 and the object X1 at a point in time when the carrier 1 has just started to move toward the object X1. At this point in time, the object X1 has not shifted yet. FIG. 15B illustrates a situation where the object X1 has shifted while the carrier 1 is moving toward the object X1. At this point in time, the control system 3 performs the shift decision processing to decide that the object X1 should have shifted. FIG. 15C illustrates the relative locations of the carrier 1 and the object X1 at a point in time when the control system 3 has performed the second retry processing to reset the target area at a location where the object X1 that has shifted is present and then started, all over again, performing the processing of making the carrier 1 move toward the object X1. As can be seen, unlike the first retry processing, the second retry processing does not include performing the processing of making the carrier 1 return to a point where the carrier 1 was located before starting to move toward the target area. The second retry processing may be performed, for example, in a situation where the track is modifiable easily even at a point where a decision is made that the object X1 should have shifted.

This operation example achieves the following advantages over a method in which the carrier (mover) 1 is allowed to move continuously to the object X1, no matter whether the object X1 has shifted or not (i.e., a mover control method according to a second comparative example). Specifically, according to the mover control method of the second comparative example, even if the object X1 has shifted from the estimated location and orientation, the carrier 1 is still allowed to move continuously to the object X1. Thus, according to the mover control method of the second comparative example, the object of making the carrier 1 move to the object X1 may be unachievable due to failure of the carrier 1 to reach the object X1 or collision of the carrier 1 against the object X1.

In contrast, according to this operation example, some preventive measures such as modifying the track of the carrier 1 may be taken at a point in time when a decision is made that the object X1 should have shifted. Thus, this operation example reduces the chances of causing inconveniences such as the failure of the carrier 1 to reach the object X1 and the collision of the carrier 1 against the object X1 as is observed in the mover control method according to the second comparative example, thus facilitating achieving the object of making the carrier 1 move to the object X1. That is to say, this operation example has the advantage of allowing the carrier (mover) 1 to move smoothly to the object X1.

Optionally, in this operation example, the control system 3 may perform alert processing of calling an alert for the shift of the object X1 either instead of performing the retry processing or in parallel with the retry processing. That is to say, the control processing (third control processing) may include processing of calling an alert for the fact that the object X1 has shifted. When performing the alert processing, the control system 3 may alert, by emitting an alert message from a loudspeaker provided for the carrier 1, for example, persons at work surrounding the carrier 1 to the fact that the object X1 has shifted. In that case, on receiving the alert message, the persons at work may take some preventive measures such as returning the object X1 to its previous location. Optionally, when performing the alert processing, the control system 3 may alert the high-order system 4 via the communications unit 32 to the fact that the object X1 has shifted. In that case, the administrator of the high-order system 4 may take some preventive measures such as returning the object X1 to its previous location either by heading to the spot him- or herself or by giving an instruction to send a person (such as a subordinate) to the spot.

Also, in this operation example, if a decision is made, as a result of the shift decision processing, that the object X1 should have shifted and the object X1 has moved to a location which is at least a predetermined distance away from the target area, then the control system 3 may bring the carrier 1 to a halt. That is to say, the control processing (third control processing) may include processing of making the carrier (mover) 1 stop moving to the object X1 when finding the object X1 falling outside a predetermined area. This aspect achieves the advantage of reducing the chances of the carrier 1 entering an area that is another carrier's 1 territory to interfere with the latter carrier's 1 operation.

Furthermore, according to this aspect, the control system 3 may also detect to what direction the object X1 has shifted. That is to say, the control processing (third control processing) may include the processing of detecting the direction to which the object X1 has fallen outside the predetermined area. This processing may be performed by tracking the location of each of the feature portions X10 based on the result of detection by the detection unit 11 (sensor 110). This aspect has the advantage of making the location of the object X1 that has shifted easily recognizable. In addition, according to this aspect, if a decision is made that the object X1 should have shifted to enter the area that is another carrier's 1 territory, then the control system 3 may notify the high-order system 4 via the communications unit 32 of that. According to this aspect, the high-order system 4 may instruct the latter carrier 1 to carry the object X1 that has shifted.

Furthermore, the control system 3 may determine, based on the decision made by the shift decision processing, what processing (such as retry processing or alert processing) needs to be performed as the third control processing. That is to say, the type of the control processing (third control processing) may be determined by the parameters of the shift of the object X1. Specifically, the shift decision processing allows a determination to be made about, for example, whether or not the object X1 has shifted, in which direction the object X1 has shifted, the velocity at which the object X1 has shifted, and whether or not the object X1 has deviated from its detectible area.

(3.3) Third Operation Example

Next, a third operation example of the mover control system 100 according to this embodiment will be described. The third operation example is an exemplary operation to be performed by the carrier 1 during the carrying processing of the basic operation example, i.e., while the carrier 1, holding the object X1 thereon, is carrying the object X1 to its destination.

While holding and carrying the object X1 to its destination, the carrier 1 may need to make a turn to change its traveling direction. In the example illustrated in FIG. 16, the carrier 1 holds the object X1 thereon by entering the gap under the object X1 and lifting the object X1, returns to its previous location (target node C0), and then moves toward its destination along the traveling route C1. In this embodiment, the traveling route C1 includes an area C10 in which the object X1 is arranged and in which the carrier 1 is allowed to move. The area C10 may be a place for pallets, for example. A plurality of such areas C10 may be set on the traveling surface 200. In the example illustrated in FIG. 16, three areas C10 are set on the traveling surface 200.

Figure 16:
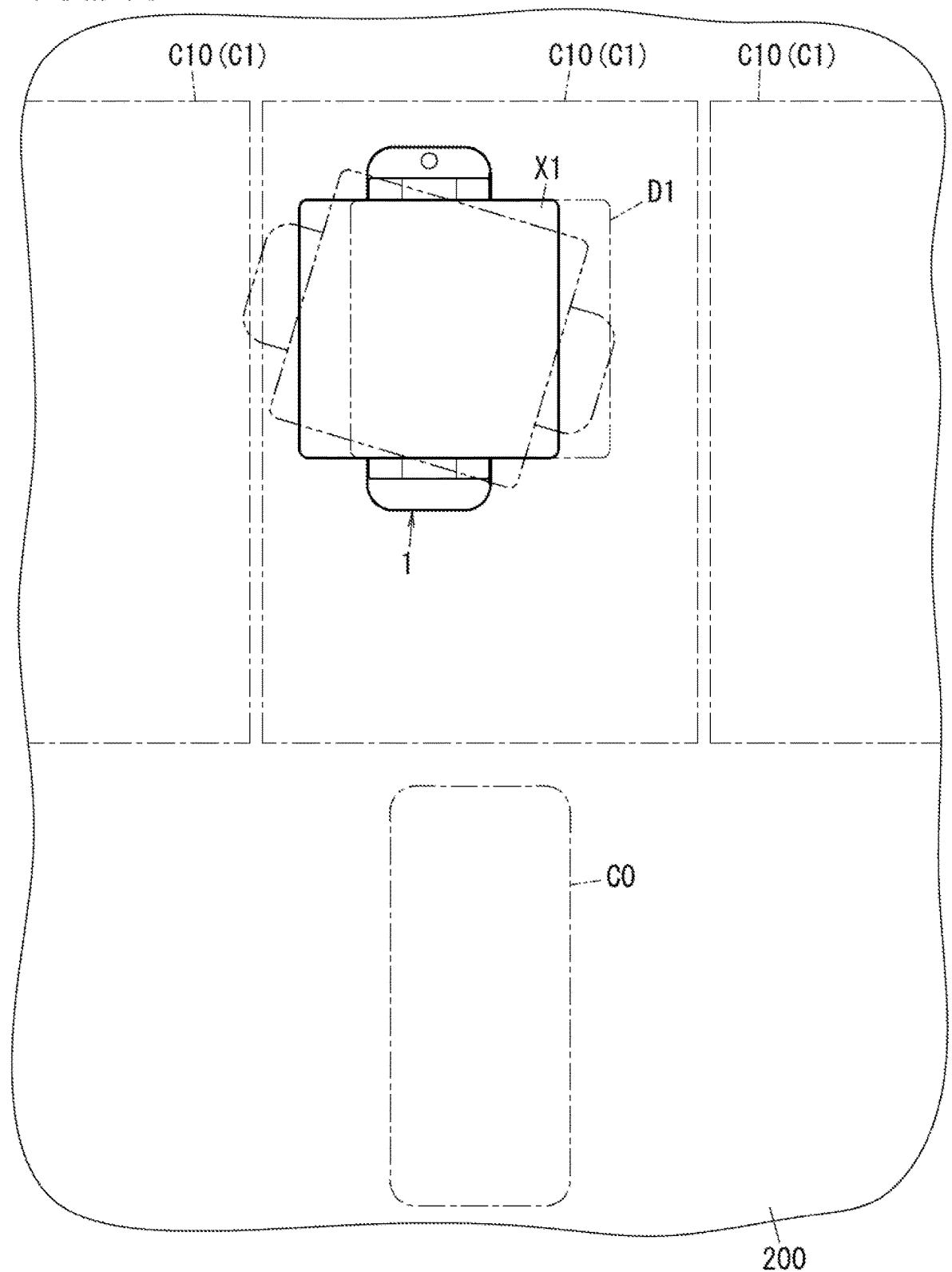
FIG. 16 is a schematic plan view illustrating a mover and an object in an operation example of a mover control system according to a comparative example.

In the example illustrated in FIG. 16, the carrier 1 is carrying the object X1 arranged in the central one C10 of the three areas C10. In this case, as described above, if the object X1 is placed by a human in the area C10, for example, then the object X1 may be arranged to fall outside, or be tilted with respect to, the predetermined location D1 depending on how carefully the person in charge of carrying has done the carrying job. In the example illustrated in FIG. 16, the object X1 is arranged to have shifted and fallen outside the predetermined location D1. In this case, if the carrier 1 holding the object X1 thereon makes a turn on the spot where the carrier 1 has picked up the object X1, then the object X1 may deviate from the area C10 (i.e., the traveling route C1) to an adjacent area C10. In that case, the object X1 may come into contact with another object X1 or equipment in the adjacent area C10.

Thus, in this third operation example, the control system 3 performs decision processing. Specifically, in this third operation example, the control system 3 determines whether or not the carrier (mover) 1 carrying the object X1 thereon is going to deviate from the traveling route C1, through which the carrier (mover) 1, as well as the object X1, is allowed to pass. In this case, the decision processing may include determining whether or not the carrier 1 is on the verge of deviating from the traveling route C1 at present and whether or not the carrier 1 will deviate from the traveling route C1 in a few ten seconds or in a few minutes from the present.

In this operation example, the control system 3 determines whether or not the carrier 1, as well as the object X1, is going to deviate from the area C10 while the carrier 1, holding the object X1 thereon, is making a turn. That is to say, the decision processing includes the processing of determining whether or not the carrier (mover) 1 is going to deviate from the area C10 (traveling route C1) while making a turn.

In addition, in this third operation example, the control system 3 also performs the first control processing. That is to say, in this third operation example, when deciding, as a result of the decision processing, that the carrier 1 should be going to deviate from the area C10 (traveling route C1), the control system 3 controls the carrier (mover) 1. In this operation example, the control system 3 tries, as an example of the first control processing, adjustment processing including modifying the track such that the carrier 1 including the object X1 will not deviate from the area C10. That is to say, the control processing (first control processing) includes processing of adjusting the pivotal axis of the carrier (mover) 1 turning such that the carrier (mover) 1 will not deviate from the area C10 (traveling route C1).

Next, a series of processing steps to be performed in this third operation example by the mover control system 100 according to this embodiment will be described with reference to FIGS. 17 and 18. In the flowchart shown in FIG. 17, the processing steps S32 and S33 correspond to the decision processing and the processing step S34 corresponds to the first control processing. The third operation example shown in FIG. 17 is started at a point in time when the control system 3 has finished performing the holding processing, i.e., the carrier 1 has lifted and picked up the object X1.

First, when finishing the holding processing, the control system 3 starts performing the carrying processing as described above. Specifically, the control system 3 starts performing the processing of making the carrier 1 move to its destination along the traveling route C1 (in S31). While the carrier 1 is moving toward its destination, the control system 3 acquires as needed the result of detection by the detection unit 11. The result of detection acquired at this time from the detection unit 11 is not the result of detection by the sensor 110 but may be, for example, the number of revolutions of the drive wheels. That is to say, the control system 3 continues to monitor the location of the body 2 (carrier 1) by acquiring as needed the result of detection by the detection unit 11.

In this case, the control system 3 has already estimated the type of the object X1 by the second estimation processing completed. This means that the control system 3 has learned about the shape, dimensions, and other parameters of the object X1 held by the carrier 1. This allows the control system 3 to continue to monitor, based on the result of detection by the detection unit 11 and the result of estimation obtained through the second estimation processing, the area occupied by the carrier 1 including the object X1. Then, the control system 3 determines, as needed, whether or not the area occupied by the carrier 1 including the object X1 falls within the area C10 (in S32). That is to say, the decision processing includes determining, based on the shape and dimensions of the object X1, whether or not the carrier 1 is going to deviate from the area C10 (traveling route C1).

If the area occupied by the carrier 1 including the object X1 falls within the area C10 (i.e., if the carrier 1 is not going to deviate from the area C10) (if the answer is NO in S33), then the control system 3 lets the carrier 1 continue to move toward its destination (in S31). On the other hand, if the area occupied by the carrier 1 including the object X1 does not fall within the area C10 (i.e., if the carrier 1 is going to deviate from the area C10) (if the answer is YES in S33), then the control system 3 performs adjustment processing to adjust the location of the carrier 1 (in S34).

Figure 18A:
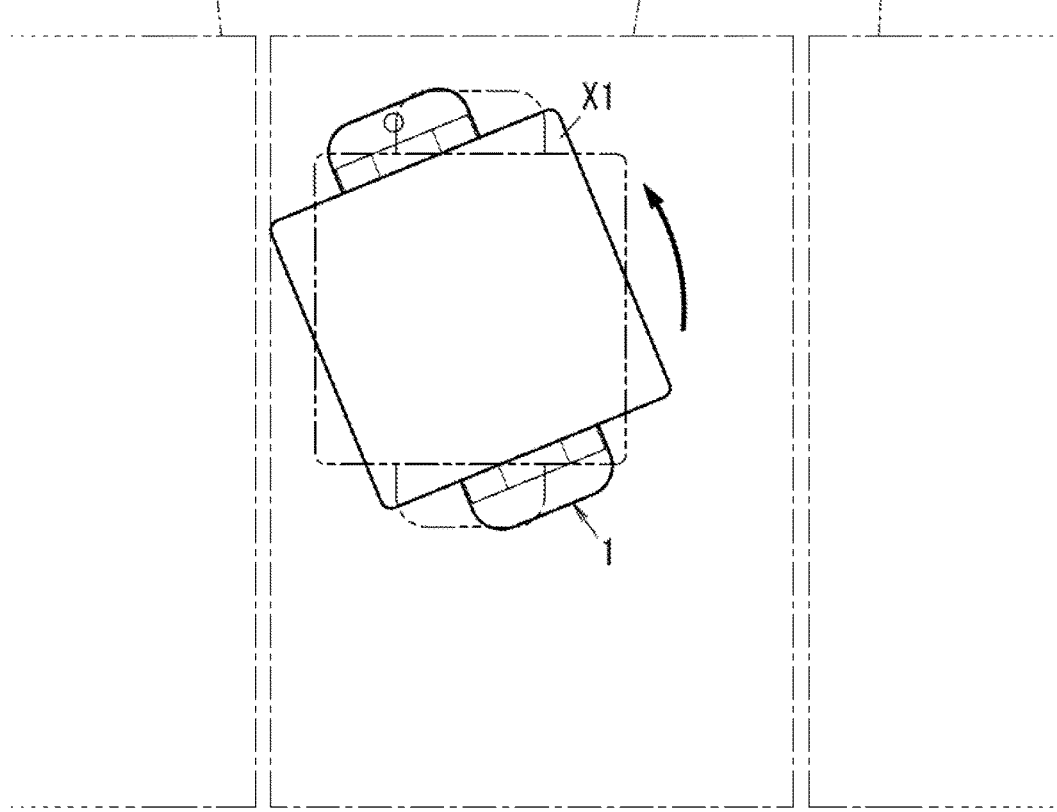
FIGS. 18A and 18B are schematic plan views illustrating a mover and an object in the third operation example of the mover control system.
Figure 18B:
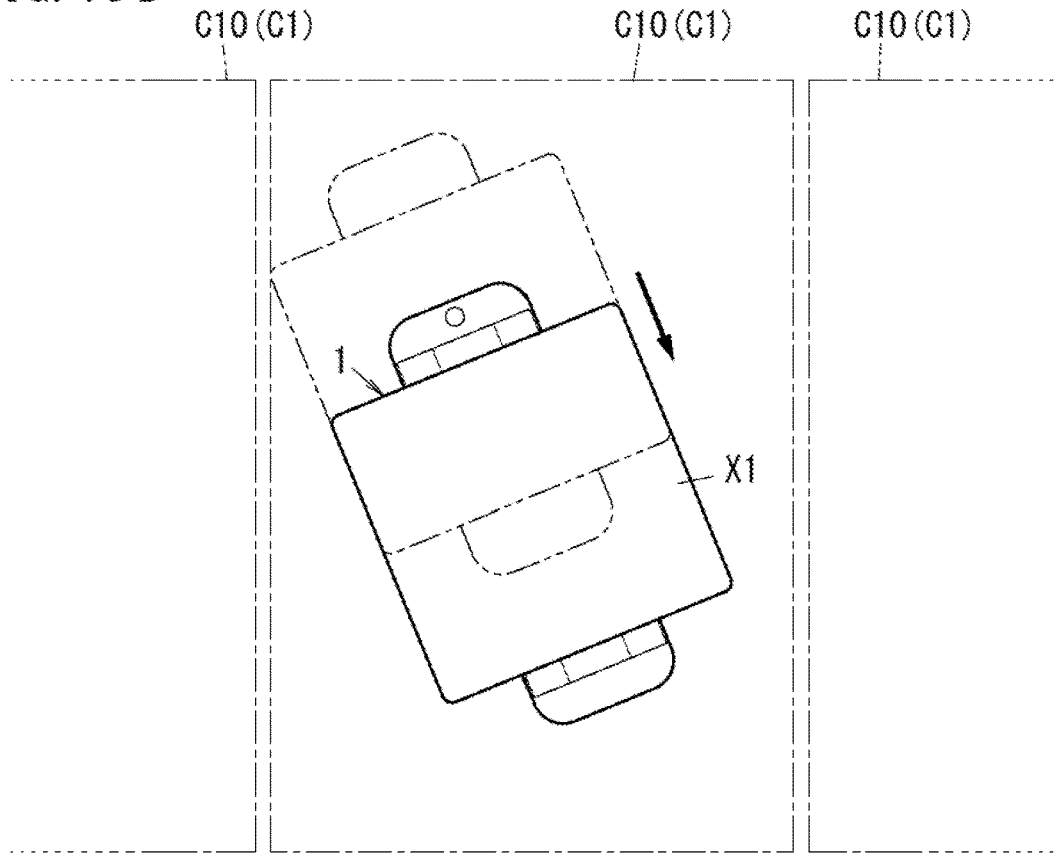

Next, a specific example of the adjustment processing will be described with reference to FIGS. 18A and 18B. FIG. 18A illustrates a state where the object X1 is on the verge of deviating from the area C10 while the carrier 1 is making a turn (i.e., turning to the left). At this point in time, the control system 3 decides, as a result of the decision processing, that the carrier 1 should be going to deviate from the traveling route C1 (i.e., the area C10). Then, the control system 3 adjusts the location of the pivotal axis of the carrier 1 by moving the carrier 1 to a location where the carrier 1 does not deviate from the area C10 even when making a turn there. In FIG. 18B, the control system 3 adjusts the location of the pivotal axis of the carrier 1 by making the carrier 1 retreat to the middle of the width of the area C10. When finishing the adjusting processing, the control system 3 lets the carrier 1 resume moving toward the carrier 1 (in S31).

This operation example achieves the following advantage over a method in which the carrier 1 is allowed to move without taking the deviation from the traveling route C1 into account (hereinafter referred to as a "mover control method according to a third comparative example"). Specifically, according to the mover control method of the third comparative example, the carrier 1 is allowed to move continuously even when the object X1 has deviated from the area C10 (traveling route C1), and therefore, the carrier 1 may come into contact with another object X1 or equipment in the adjacent area C10. To avoid such a situation, the width of the area C10 may be broadened. Nevertheless, the width of the area C10 cannot be broadened beyond a certain limit, considering the overall area of the traveling surface 200 within the facility. In addition, broadening the width of the area C10 causes a decrease in the number of areas C10 that may be set on the traveling surface 200, thus eventually decreasing the number of places in which the objects X1 may be arranged.

In contrast, this operation example allows taking some measures (such as modifying the track of the carrier 1) at a point in time when a decision is made that the object X1 is going to deviate from the traveling route C1. Thus, this operation example reduces the chances of causing inconveniences such as collision of the object X1 against another object X1 or equipment in the adjacent area C10 as is observed when the mover control method according to the third comparative example is adopted. That is to say, this operation example has the advantage of allowing the carrier (mover) 1 to smoothly move more easily while holding the object X1 thereon. In addition, this operation example also has the advantage of eliminating the problems that would arise when the width of the area C10 is broadened, because there is no need to broaden the width of the area C10 according to this operation example.

Optionally, according to this operation example, the control system 3 may perform the processing of changing the traveling route C1, instead of performing the adjustment processing. Specifically, if the control system 3 decides, as a result of the decision processing, that the carrier 1 should be going to deviate from the current traveling route C1, then the control system 3 may search for another route that allows the carrier 1 to travel without deviation and may set the route thus found as a new traveling route C1. That is to say, the control processing (first control processing) may include the processing of changing the traveling route C1 into such a route that allows the carrier (mover) 1 to travel without deviating from the route.

Optionally, according to this operation example, the control system 3 may perform alert processing of calling an alert for the deviation from the traveling route C1 either instead of performing the adjustment processing or in parallel with the adjustment processing. That is to say, the control processing (first control processing) may include processing of calling an alert for the fact that the carrier 1 will deviate from the traveling route C1. When performing the alert processing, the control system 3 may alert, by emitting an alert message from a loudspeaker provided for the carrier 1, for example, persons at work surrounding the carrier 1 to the fact that the carrier 1 will deviate from the traveling route C1. In that case, on receiving the alert message, the persons at work may take some measures such as temporarily putting aside another object X1, equipment, or any other obstacle located in the area adjacent to the traveling route C1. Optionally, when performing the alert processing, the control system 3 may also alert the high-order system 4 via the communications unit 32 to the fact that the carrier 1 will deviate from the traveling route C1. In that case, the administrator of the high-order system 4 may take some measures such as temporarily putting aside, from the traveling route C1, another object X1, equipment, or any other obstacle located in the area adjacent to the traveling route C1 either by heading to the spot him- or herself or by giving an instruction to send a person (such as a subordinate) to the spot.

In the area C10, the carrier 1 is allowed to make a turn. Depending on the traveling route C1, however, the carrier 1 may be prohibited from making a turn. Thus, according to this operation example, the control system 3 may determine the type of the first control processing depending on whether or not the carrier 1 is allowed to make a turn on the traveling route C1 (e.g., a determination may be made whether the adjustment processing including making a turn or the alert processing should be performed with the carrier 1 made to stop moving in the latter case). That is to say, the control processing (first control processing) may include processing of determining, in accordance with information indicating that the carrier (mover) 1 is allowed to make a turn or prohibited from making a turn, whether or not the carrier 1 is allowed to make a turn.

In addition, according to this operation example, if the carrier 1 is allowed in advance to deviate from the traveling route C1 by the high-order system 4, for example, the control system 3 may let the carrier 1 move continuously toward its destination, irrespective of the result of the decision processing. That is to say, the control processing (first control processing) may include the processing of allowing, when the predetermined condition of allowance is satisfied, the carrier 1 to deviate from the traveling route C1 irrespective of the result of the decision processing. For example, when finding the adjacent area C10 (traveling route C1) vacant (i.e., having no object X1 or any other obstacle placed there) (i.e., when finding the predetermined condition satisfied), the high-order system 4 makes the control system 3 allow the carrier 1 to deviate from the traveling route C1.

Optionally, in this operation example, the control system 3 may notify the high-order system 4 of the result of the decision processing via the communications unit 32 without performing the first control processing. That is to say, the control system 3 may further perform output processing of outputting the result of the decision processing to the high-order system 4 for remote-controlling the carrier (mover) 1. According to this aspect, when notified of the result of the decision processing, the high-order system 4 may take some measures such as giving another carrier 1 an instruction to temporarily prohibit the carrier 1 from traveling through another traveling route C1 adjacent to the traveling route C1, for example.

(3) Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure. The functions of the mover control method and mover control system 100 according to the embodiment described above may also be implemented as a computer program or a non-transitory storage medium on which the computer program is stored, for example.

A program according to an aspect is designed to cause one or more processors to carry out the mover control method (including the acquisition processing and the first control processing) described above. A program according to another aspect is designed to cause one or more processors to carry out the mover control method (including the shift decision processing and the second control processing) described above. A program according to still another aspect is designed to cause one or more processors to carry out the mover control method (including the decision processing and third control processing) described above.

Next, variations of the exemplary embodiment will be enumerated one after another. The variations to be described below may be adopted in combination as appropriate.

In the mover control system 100 according to the present disclosure, the control system 3, the high-order system 4, and other control units each include a computer system. The computer system includes a processor and a memory as principal hardware components. The functions of the control system 3 and high-order system 4 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, the plurality of constituent elements (or the functions) of the control system 3 and the high-order system 4 are integrated together in a single housing. However, this is not an essential configuration for the mover control system 100. That is to say, those constituent elements (or functions) of the control system 3 and high-order system 4 may be distributed in multiple different housings. Alternatively, at least some functions of the control system 3 and the high-order system 4 (e.g., some functions of the high-order system 4) may be implemented as, for example, a cloud computing system as well.

In the embodiment described above, the first estimation processing may include estimating, based on the result of detection by the detection unit 11 (sensor 110) and the result of capturing by a camera, the located and orientation of the object X1. In other words, the processing of estimating the location and orientation of the object X1 (first estimation processing) may further use the result of capturing by the camera that shoots the surroundings of the carrier (mover) 1. The camera is installed, for example, in a facility where the mover control system 100 is adopted. The camera is suitably installed at a position where the camera may have a bird's eye view of the object X1 in the facility. This aspect has the advantage of allowing the location and orientation of the object X1 to be estimated more accurately compared to a situation where only the result of detection by the detection unit 11 is used. Note that the control system 3 may use the result of capturing by the camera when performing the first estimation processing for the first time. Alternatively, the control system 3 may use the result of capturing by the camera when performing the first estimation processing for the second time and on (i.e., when recognizing only some of the feature portions X10).

In the embodiment described above, the detection unit 11 includes a LiDAR, a sonar sensor, or a radar sensor. However, this is only an example and should not be construed as limiting. Alternatively, the detection unit 11 may include a sensor such as a stereo camera or a motion stereo camera.

In the embodiment described above, the high-order system 4 is not an essential constituent element for the mover control system 100 but may be omitted as appropriate. In such an implementation, the control system 3 may control the carrier (mover) 1 by itself.

In the embodiment described above, the carrier 1 is supposed to carry the object X1 by lifting the object X1. However, this is only an example and should not be construed as limiting. Alternatively, the carrier 1 may also be configured to carry the object X1 by, for example, towing, pushing, gripping, or absorbing (or catching) the object X1.

In the embodiment described above, the carrier 1 may also be configured to carry a feeder exchange handcart, for example, as the object X1. In this implementation, the carrier 1 may couple the handcart to an electronic component mounter (mounter) by carrying the handcart to the mounter.

In the embodiment described above, the mover 1 may refer to various types of movers including automated guided vehicles (AGVs), moving robots, and drones. As used herein, the "moving robot" refers to any of various types of robots including wheeled robots and endless track robots, for example. Also, the mover 1 does not have to have the function of carrying the object X1 but may have any of various other functions including picking, welding, mounting, displaying, greeting customers, security guarding, assembling, and testing, for example.

In the embodiment described above, the control system 3 has only to perform at least the control processing and does not have to perform any of the other types of processing. For example, the decision processing may be performed by the high-order system 4 instead of being performed by the decision unit 304 of the control system 3. In that case, the high-order system 4 may acquire information required for the decision processing (such as information about the shape and dimensions of the object X1 held by the carrier 1) from the carrier (mover) 1.

(Recapitulation)

As can be seen from the foregoing description, a mover control method according to a first aspect includes decision processing and control processing (first control processing). The decision processing is the processing of determining whether or not a mover (1) that is carrying an object (X1) thereon is going to deviate from a traveling route (C1), through which the mover (1), as well as the object (X1), is allowed to pass. The control processing is the processing of controlling the mover (1) based on a result of the decision processing.

This aspect has the advantage of allowing the mover (1) to move smoothly while holding an object (X1) thereon.

In a mover control method according to a second aspect, which may be implemented in conjunction with the first aspect, the decision processing includes processing of determining whether or not the mover (1) carrying the object (X1) thereon is going to deviate from the traveling route (C1) while the mover (1) is turning.

This aspect has the advantage of facilitating taking preventive measures against deviation of the mover (1) from the traveling route (C1) while the mover (1) is turning.

In a mover control method according to a third aspect, which may be implemented in conjunction with the second aspect, the control processing includes processing of adjusting a pivotal axis of the mover while the mover (1) is turning to prevent the mover (1) carrying the object (X1) thereon from deviating from the traveling route (C1).

This aspect has the advantage of allowing the mover (1) to make a turn more easily without deviating from the traveling route (C1).

In a mover control method according to a fourth aspect, which may be implemented in conjunction with any one of the first to third aspects, the control processing includes processing of changing the traveling route (C1) into a route along which the mover (1) carrying the object (X1) thereon is able to travel without deviating therefrom.

This aspect has the advantage of allowing the mover (1) to move smoothly while holding an object (X1) thereon.

In a mover control method according to a fifth aspect, which may be implemented in conjunction with any one of the first to fourth aspects, the control processing includes processing of calling an alert for expected deviation from the traveling route (C1).

This aspect has the advantage of allowing either a person who is present around the mover (1) or an administrator of a system including the mover (1) (i.e., a high-order system (4)) to take preventive measures against the deviation of the mover (1) from the traveling route (C1).

In a mover control method according to a sixth aspect, which may be implemented in conjunction with any one of the first to fifth aspects, the control processing includes processing of determining, based on information about whether the mover (1) is allowed to turn or not, whether or not to allow the mover (1) to make a turn.

This aspect has the advantage of allowing taking some measures for even a traveling route (C1) on which the mover (1) is not allowed to make any turn.

In a mover control method according to a seventh aspect, which may be implemented in conjunction with any one of the first to sixth aspects, the control processing includes processing of allowing, if a predetermined condition of allowance is satisfied, the mover (1) to deviate from the traveling route (C1) irrespective of the result of the decision processing.

This aspect has the advantage of shortening the time it takes for the mover (1) to reach its destination because the mover (1) is allowed to move continuously without waiting for the decision to be made in the decision processing.

A mover control method according to an eighth aspect, which may be implemented in conjunction with any one of the first to seventh aspects, further includes output processing including outputting the result of the decision processing to a high-order system (4) to remote-control the mover (1).

This aspect has the advantage of facilitating the administrator of the high-order system (4) taking preventive measures against the deviation of the mover (1) from the traveling route (C1).

In a mover control method according to a ninth aspect, which may be implemented in conjunction with any one of the first to eighth aspects, the decision processing includes determining, based on a shape and dimensions of the object (X1), whether or not the mover (1) carrying the object (X1) thereon is going to deviate from the traveling route (C1).

This aspect has the advantage of allowing the decision to be made more easily about whether or not the object (X1) is going to deviate from the traveling route (C1).

In a mover control method according to a tenth aspect, which may be implemented in conjunction with any one of the first to ninth aspects, the decision processing is performed by the mover (1).

This aspect has the advantage of allowing the processing of making the mover (1) move smoothly while holding the object (X1) thereon to be completed on the mover (1) end.

In a mover control method according to an eleventh aspect, which may be implemented in conjunction with any one of the first to ninth aspects, the decision processing is performed by a high-order system (4) to remote-control the mover (1).

This aspect has the advantage of allowing, when there are a plurality of movers (1), for example, the processing of making each of the movers (1) move smoothly while holding the object (X1) thereon to be carried out collectively by the high-order system (4).

In a mover control method according to a twelfth aspect, which may be implemented in conjunction with any one of the first to eleventh aspects, the mover (1) includes a detection unit (11). The mover control method further includes acquisition processing and second control processing. The acquisition processing is processing of acquiring a detection result obtained by the detection unit (11) and including distance information about a distance between the mover (1) and the object (X1). The second control processing is processing of controlling the mover (1) based on the detection result on recognizing some of a plurality of feature portions (X10) of the object (X1) to estimate a location and an orientation of the object (X1). The second control processing is performed separately from first control processing as the control processing.

This aspect has the advantage of allowing the mover (1) to move smoothly to the object (X1).

A mover control method according to a thirteenth aspect, which may be implemented in conjunction with any one of the first to twelfth aspects, further includes shift decision processing and third control processing. The shift decision processing is processing of determining whether or not the object (X1) has shifted while the mover (1) is being made to move to the object (X1). The third control processing is processing of controlling the mover (1) when a decision is made, as a result of the shift decision processing, that the object (X1) should have shifted. The third control processing is performed separately from first control processing as the control processing.

This aspect has the advantage of allowing the mover (1) to move smoothly to the object (X1).

A mover control system (100) according to a fourteenth aspect includes: a mover (1) to carry an object (X1) thereon; and a control system (3) to control the mover (1). The control system (3) includes a decision unit (304) and a control unit (302). The decision unit (304) determines whether or not the mover (1) that is carrying the object (X1) thereon is going to deviate from a traveling route (C1), through which the mover (1), as well as the object (X1), is allowed to pass. The control unit (302) controls the mover (1) based on a result obtained by the decision unit (304).

This aspect has the advantage of allowing the mover (1) to move smoothly while holding an object (X1) thereon.

A program according to a fifteenth aspect is designed to cause one or more processors to carry out the mover control method according to any one of the first to thirteenth aspects.

This aspect has the advantage of allowing the mover (1) to move smoothly while holding an object (X1) thereon.

Note that the features of the methods according to the second to thirteenth aspects are not essential features for the mover control method but may be omitted as appropriate.

A mover control method according to a sixteenth aspect includes shift decision processing and control processing (third control processing). The shift decision processing is processing of determining whether or not the object (X1) has shifted while the mover (1) is being made to move to the object (X1). The control processing is processing of controlling the mover (1) when a decision is made, as a result of the shift decision processing, that the object (X1) should have shifted.

This aspect has the advantage of allowing the mover (1) to move smoothly to the object (X1).

A mover control method according to a seventeenth aspect, which may be implemented in conjunction with the sixteenth aspect, includes retry processing of modifying a track of the mover (1) toward the object (X1) to make the mover (1) move to the object (X1) along the modified track.

This aspect has the advantage of achieving the object of allowing the carrier (1) to move to the object (X1) more easily without causing any inconvenience such as the carrier (1) failing to reach the object (X1) or the carrier (1) colliding against the object (X1).

In a mover control method according to an eighteenth aspect, which may be implemented in conjunction with the seventeenth aspect, the retry processing includes processing of making the mover (1) return to a starting point where the mover (1) has started moving toward the object (X1) before modifying its track.

This aspect has the advantage of achieving the object of allowing the carrier (1) to move to the object (X1) more easily even when it is difficult to modify its track at a point where a decision is made that the object (X1) should have shifted.

In a mover control method according to a nineteenth aspect, which may be implemented in conjunction with the seventeenth aspect, the retry processing includes processing of making the mover (1) move to the object (X1) to keep up with shift of the object (X1).

This aspect has the advantage of shortening the time it takes for the carrier (1) to move to the object (X1), compared to a situation where the mover (1) is made to return to the starting point where the mover (1) has started to move toward the object (X1).

In a mover control method according to a twentieth aspect, which may be implemented in conjunction with any one of the sixteenth to nineteenth aspects, the control processing includes processing of calling an alert for the shift of the object (X1).

This aspect has the advantage of allowing either a person who is present around the mover (1) or an administrator of a system including the mover (1) (i.e., a high-order system (4)) to take preventive measures against the shift of the object (X1).

In a mover control method according to a twenty-first aspect, which may be implemented in conjunction with any one of the sixteenth to twentieth aspects, the control processing includes processing of stopping the movement of the mover (1) to the object (X1) when detecting that the object (X1) has fallen outside a predetermined area.

This aspect has the advantage of reducing the chances of the mover (1) entering an area that is another mover's (1) territory to interfere with the latter mover's (1) operation.

In a mover control method according to a twenty-second aspect, which may be implemented in conjunction with the twenty-first aspect, the control processing includes processing of detecting a direction to which the object (X1) has fallen outside the predetermined area.

This aspect has the advantage of making the location of the object (X1) that has shifted easily detectible.

In a mover control method according to a twenty-third aspect, which may be implemented in conjunction with any one of the sixteenth to twenty-second aspects, the shift decision processing includes determining, based on a move of one or more monitor targets out of a plurality of monitor targets (feature portions (X10)) included in the object (X1), whether or not the object (X1) has shifted.

This aspect achieves the advantage of enabling determining, as needed, whether or not the object (X1) has shifted.

In a mover control method according to a twenty-fourth aspect, which may be implemented in conjunction with the twenty-third aspect, one or more monitor targets include a caster.

This aspect has the advantage of allowing determining, based on not only the movement of the entire object (X1) but also the move of only a part (caster) of the object (X1), whether or not the object (X1) has shifted.

In a mover control method according to a twenty-fifth aspect, which may be implemented in conjunction with any one of the sixteenth to twenty-fourth aspects, the shift decision processing includes determining, based on a result of detection by the detection unit (11) included in the mover (1), whether or not the object (X1) has shifted.

This aspect has the advantage of allowing determining, without being provided with information by a system other than the mover (1) (i.e., the high-order system (4)), whether or not the object (X1) has shifted.

In a mover control method according to a twenty-sixth aspect, which may be implemented in conjunction with any one of the sixteenth to twenty-fifth aspects, the object (X1) is a burden carried by the mover (1).

This aspect has the advantage of allowing the carrier (1), which is the mover (1) carrying the object (X1) thereon, to smoothly move to the object (X1).

A mover control method according to a twenty-seventh aspect, which may be implemented in conjunction with the twenty-sixth aspect, includes holding processing and carrying processing. The holding processing is processing of having the object (X1) held by the mover (1) by making the mover (1) enter the gap under the object (X1) and having the object (X1) lifted by the mover (1). The carrying processing is processing of making the mover (1) move to its destination with the object (X1) held by the mover (1).

This aspect has the advantage of allowing the object (X1) to be carried smoothly to its destination by the carrier (1) that is the mover (1) carrying the object (X1) thereon.

In a mover control method according to a twenty-eighth aspect, which may be implemented in conjunction with any one of the sixteenth to twenty-seventh aspects, specifics of the control processing are determined according to a mode of shift of the object (X1).

This aspect has the advantage of facilitating taking appropriate measures according to the mode of shift of the object (X1).

A mover control system (100) according to a twenty-ninth aspect includes a mover (1) and a control system (3) to control the mover (1). The control system (3) includes a shift decision unit (303) and a control unit (302). The shift decision unit (303) determines whether or not the object (X1) has shifted while the mover (1) is being made to move to the object (X1). The control unit (302) controls the mover (1) when the shift decision unit (303) has decided that the object (X1) should have shifted.

This aspect has the advantage of allowing the mover (1) to smoothly move to the object (X1).

A program according to a thirtieth aspect is designed to cause one or more processors to carry out the mover control method according to any one of the sixteenth to twenty-eighth aspects.

This aspect has the advantage of allowing the mover (1) to smoothly move to the object (X1).

Note that the features of the methods according to the seventeenth to twenty-eighth aspects are not essential features for the mover control method but may be omitted as appropriate.

A mover control method according to a thirty-first aspect includes acquisition processing and control processing (second control processing). The acquisition processing is processing of acquiring a detection result obtained by the detection unit (11) and including distance information about a distance between the mover (1) including a detection unit (11) and the object (X1). The control processing is processing of controlling the mover (1) based on the detection result on recognizing some of a plurality of feature portions (X10) of the object (X1) to estimate a location and an orientation of the object (X1).

This aspect has the advantage of allowing the mover (1) to smoothly move to the object (X1).

In a mover control method according to a thirty-second aspect, which may be implemented in conjunction with the thirty-first aspect, the control processing includes sub-processing of making the mover (1) move to a location where the plurality of feature portions (X10) of the object (X1) are all recognizable.

This aspect has the advantage of improving the accuracy of estimating the location and orientation of the object (X1).

In a mover control method according to a thirty-third aspect, which may be implemented in conjunction with the thirty-second aspect, the control processing includes main processing of making the mover (1) move to the object (X1). The main processing is performed when the location and orientation of the object (X1) are estimated while the sub-processing is being performed.

This aspect has the advantage of allowing shortening the time it takes to make the mover (1) move to the object (X1), compared to a situation where the main processing is performed after the sub-processing has been finished.

In a mover control method according to a thirty-fourth aspect, which may be implemented in conjunction with the thirty-first aspect, the control processing includes main processing of making the mover (1) move to the object (X1). The main processing is performed when the location and orientation of the object (X1) are estimated based on a result of recognition of some feature portions (X10).

This aspect has the advantage of allowing shortening the time it takes to make the mover (1) move to the object (X1), compared to a situation where the sub-processing is performed.

In a mover control method according to a thirty-fifth aspect, which may be implemented in conjunction with the thirty-third or thirty-fourth aspect, the main processing includes processing of making the mover (1) move to draw a curved trace.

This aspect has the advantage of allowing shortening the time it takes to make the mover (1) move to the object (X1), compared to a situation where the mover (1) is made to move by turning and moving forward in combination.

In a mover control method according to a thirty-sixth aspect, which may be implemented in conjunction with any one of the thirty-first to thirty-fifth aspects, the plurality of feature portions (X10) includes leg portions of the object (X1).

This aspect has the advantage of making the feature portions (X10) easily recognizable even when the mover (1) is less tall than the object (X1).

In a mover control method according to a thirty-seventh aspect, which may be implemented in conjunction with any one of the thirty-first to thirty-sixth aspects, the processing of estimating the location and orientation of the object (X1) (first estimation processing) includes using information about a relative location of the object (X1) with respect to the mover (1).

This aspect has the advantage of allowing the location and orientation of the object (X1) to be estimated based on information that may be acquired relatively easily by the mover (1).

In a mover control method according to a thirty-eighth aspect, which may be implemented in conjunction with the thirty-seventh aspect, the processing of estimating the location and orientation of the object (X1) (first estimation processing) includes further using a result of capturing obtained by a camera to shoot surroundings of the mover (1).

This aspect has the advantage of improving the accuracy of estimating the location and orientation of the object (X1) by using the result of capturing by the camera in addition to the distance information.

In a mover control method according to a thirty-ninth aspect, which may be implemented in conjunction with any one of the thirty-first to thirty-eighth aspects, the object (X1) is a burden carried by the mover (1).

This aspect has the advantage of allowing the carrier (1), which is the mover (1) carrying the object (X1) thereon, to smoothly move to the object (X1).

A mover control method according to a fortieth aspect, which may be implemented in conjunction with the thirty-ninth aspect, includes holding processing and carrying processing. The holding processing is processing of having the object (X1) held by the mover (1) by making the mover (1) enter the gap under the object (X1) and having the object (X1) lifted by the mover (1). The carrying processing is processing of making the mover (1) move to its destination with the object (X1) held by the mover (1).

This aspect has the advantage of allowing the object (X1) to be carried smoothly to its destination by the carrier (1) that is the mover (1) carrying the object (X1) thereon.

A mover control system (100) according to a forty-first aspect includes: a mover (1) including a detection unit (11); and a control system (3) to control the mover (1). The control system (3) includes an acquisition unit (301) and a control unit (302). The acquisition unit (301) acquires a detection result obtained by the detection unit (11) and including distance information about a distance between the mover (1) and the object (X1). The control unit (302) controls the mover (1) based on the detection result on recognizing some of a plurality of feature portions (X10) of the object (X1) to estimate a location and an orientation of the object (X1).

This aspect has the advantage of allowing the mover (1) to smoothly move to the object (X1).

A program according to a forty-second aspect is designed to cause one or more processors to carry out the mover control method according to any one of the thirty-first to fortieth aspects.

This aspect has the advantage of allowing the mover (1) to smoothly move to the object (X1).

Note that the features of the methods according to the thirty-second to fortieth aspects are not essential features for the mover control method but may be omitted as appropriate.

REFERENCE SIGNS LIST

1 Carrier (Mover)
11 Detection Unit
3 Control System
301 Acquisition Unit
302 Control Unit
303 Shift Decision Unit
304 Decision Unit
4 High-Order System
100 Mover Control System
C1 Traveling Route
X1 Object
X10 Feature Portion (Monitor Target)

What is claimed is:

1. A mover control method comprising:
   acquisition processing including acquiring a detection result including distance information about a distance between a mover configured to carry an object while holding the object and the object, the detection result being obtained by a detection unit provided to the mover, acquisition processing being performed before the mover holds the object, the object having a plurality of feature portions for estimating a location and an orientation of the object; and
   control processing including controlling the mover based on the detection result on recognizing some of the plurality of feature portions of the object.

2. The mover control method of claim 1, wherein
   the control processing includes sub-processing of making the mover move to a location where the plurality of feature portions of the object are all recognizable.

3. The mover control method of claim 2, wherein
   the control processing includes main processing of making the mover move to the object and
   the main processing is performed when the location and orientation of the object are estimated while the sub-processing is being performed.

4. The mover control method of claim 1, wherein
the control processing includes main processing of making the mover move to the object and
the main processing is performed when the location and orientation of the object are estimated based on a result of recognition of some feature portions.

5. The mover control method of claim 1, wherein
the plurality of feature portions includes leg portions of the object.

6. The mover control method of claim 1, wherein
the processing of estimating the location and orientation of the object includes using information about a relative location of the object with respect to the mover.

7. The mover control method of claim 1, further comprising:
decision processing including determining whether or not the mover that is carrying the object thereon is going to deviate from a traveling route, through which the mover, as well as the object, is allowed to pass; and
first control processing including controlling the mover based on a result of the decision processing, the first control processing being performed separately from second control processing as the control processing.

8. The mover control method of claim 7, wherein
the decision processing includes processing of determining whether or not the mover carrying the object thereon is going to deviate from the traveling route while the mover is turning.

9. The mover control method of claim 8, wherein
the first control processing includes processing of adjusting a pivotal axis of the mover while the mover is turning to prevent the mover carrying the object thereon from deviating from the traveling route.

10. The mover control method of claim 7, wherein
the first control processing includes processing of changing the traveling route into a route along which the mover carrying the object thereon is able to travel without deviating therefrom.

11. The mover control method of claim 7, wherein
the first control processing includes processing of determining, based on information about whether the mover is allowed to turn or not, whether or not to allow the mover to make a turn.

12. The mover control method of claim 7, wherein
the decision processing includes automatically determining, based on a shape and dimensions of the object, whether or not the mover carrying the object thereon is going to deviate from the traveling route.

13. The mover control method of claim 7, wherein the decision processing is performed by the mover.

14. The mover control method of claim 7, wherein
the decision processing is performed by a high-order system configured to remote-control the mover.

15. The mover control method of claim 7, further comprising:
shift decision processing including determining whether or not the object has shifted while the mover is being made to move to the object; and
third control processing including controlling the mover when a decision is made, as a result of the shift decision processing, that the object have shifted, the third control processing being performed separately from first control processing.

16. The mover control method of claim 15, wherein
the third control processing includes retry processing of modifying a track of the mover toward the object to make the mover move to the object along the track thus modified.

17. The mover control method of claim 16, wherein
the retry processing includes processing of making the mover return, before modifying its track, to a starting point where the mover has started moving toward the object.

18. A mover control system comprising:
a mover including a detection unit, the mover configured to carry an object while holding the object, the object having a plurality of feature portions for estimating a location and an orientation of the object; and
a control system configured to control the mover,
the control system including:
an acquisition unit configured to acquire a detection result obtained by the detection unit before the mover holds the object, the detection result including distance information about a distance between the mover and the object, and
a control unit configured to control the mover based on the detection result on recognizing some of the plurality of feature portions of the object.

19. The mover control method of claim 2, wherein
the plurality of feature portions includes leg portions of the object.

20. The mover control method of claim 3, wherein
the plurality of feature portions includes leg portions of the object.

* * * * *